US010901095B2

(12) United States Patent
Yamashita

(10) Patent No.: US 10,901,095 B2
(45) Date of Patent: Jan. 26, 2021

(54) POSITION AND ATTITUDE ESTIMATION DEVICE, IMAGE PROCESSING DEVICE, AND POSITION AND ATTITUDE ESTIMATION METHOD

(71) Applicant: NEC Corporation, Tokyo (JP)

(72) Inventor: Toshiaki Yamashita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 729 days.

(21) Appl. No.: 15/301,558

(22) PCT Filed: Apr. 15, 2015

(86) PCT No.: PCT/JP2015/002073
§ 371 (c)(1),
(2) Date: Oct. 3, 2016

(87) PCT Pub. No.: WO2015/162873
PCT Pub. Date: Oct. 29, 2015

(65) Prior Publication Data
US 2017/0123060 A1 May 4, 2017

(30) Foreign Application Priority Data

Apr. 25, 2014 (JP) ................... 2014-091279

(51) Int. Cl.
G01S 19/42 (2010.01)
G01S 19/47 (2010.01)
(Continued)

(52) U.S. Cl.
CPC ........... G01S 19/426 (2013.01); G01S 19/47 (2013.01); G01S 19/53 (2013.01); G05D 1/08 (2013.01); H01Q 3/02 (2013.01); G01S 7/4004 (2013.01)

(58) Field of Classification Search
CPC .................... H01Q 3/24; H01Q 1/24
(Continued)

(56) References Cited

U.S. PATENT DOCUMENTS 5,150,856 A 9/1992 Gaide
5,430,657 A * 7/1995 Kyrtsos .................. G01S 19/27
342/357.31
(Continued)

FOREIGN PATENT DOCUMENTS

GB 2378765 A 2/2003
JP H04-265817 A 9/1992
(Continued)

OTHER PUBLICATIONS

Kain, J., & Cloutier, J. Aug. 1989, Rapid transfer alignment for tactical weapon applications. In Guidance, Navigation and Control Conference p. 3581, accessed Jan. 3, 2019, https://arc.aiaa.org/doi/pdf/10.2514/6.1989-3581. (Year: 1989).*
(Continued)

Primary Examiner — Erin F Heard
Assistant Examiner — Donald H B Braswell

(57) ABSTRACT

The present invention makes it possible to enhance the accuracy of position and attitude estimation. A position and attitude estimation device (10) is provided with a first detection unit (1) for detecting a plurality of first position and attitude parameters pertaining to the position and attitude of a moving object, a first position and attitude estimation unit (2) for estimating a first position and attitude of the moving object at a first time on the basis of the plurality of detected first position and attitude parameters, a second detection unit (3) for detecting a plurality of second position and attitude parameters pertaining to the position and attitude of the moving object, a second position and attitude estimation unit (4) for estimating a second position and
(Continued)

attitude of the moving object at a second time different from the first time on the basis of the plurality of detected second position and attitude parameters, and a position and attitude output unit (5) for outputting a third position and attitude on the basis of the estimated first position and attitude and second position and attitude.

7 Claims, 7 Drawing Sheets

(51) Int. Cl.
  *H01Q 3/02*   (2006.01)
  *G01S 19/53*   (2010.01)
  *G05D 1/08*   (2006.01)
  *G01S 7/40*   (2006.01)

(58) Field of Classification Search
  USPC ........................................................ 342/372
  See application file for complete search history.

(56) References Cited

U.S. PATENT DOCUMENTS

| | | |
|---|---|---|
| 6,317,688 B1 | 11/2001 | Bruckner et al. |
| 6,711,517 B2 | 3/2004 | Brunstein |
| 2003/0028340 A1 | 2/2003 | Brunstein |
| 2005/0102072 A1 | 5/2005 | Deakin |
| 2005/0149240 A1* | 7/2005 | Tseng ................... B60G 17/016 701/38 |
| 2005/0256637 A1* | 11/2005 | Tazartes ................. G01C 21/16 701/408 |
| 2007/0096979 A1* | 5/2007 | Hinnant, Jr. ........ G01M 5/0016 342/357.22 |
| 2008/0294342 A1* | 11/2008 | Hoshizaki ............... G01S 19/47 701/472 |

FOREIGN PATENT DOCUMENTS

| | | |
|---|---|---|
| JP | 2000-283788 A | 10/2000 |
| JP | 2001-264106 A | 9/2001 |
| JP | 2004-239643 A | 8/2004 |
| JP | 2006-038650 A | 2/2006 |
| JP | 3919911 B2 | 5/2007 |
| JP | 2007-276507 A | 10/2007 |

OTHER PUBLICATIONS

International Search Report for PCT Application No. PCT/JP2015/002073, dated Jul. 21, 2015.

English translation of Written opinion for PCT Application No. PCT/JP2015/002073.

Extended European Search Report for EP Application No. EP15782699.1 dated Nov. 3, 2017.

\* cited by examiner

POSITION AND ATTITUDE ESTIMATION DEVICE, IMAGE PROCESSING DEVICE, AND POSITION AND ATTITUDE ESTIMATION METHOD

This application is a National Stage Entry of PCT/JP2015/002073 filed on Apr. 15, 2015, which claims priority from Japanese Patent Application 2014-091279 filed on Apr. 25, 2014, the contents of all of which are incorporated herein by reference, in their entirety.

TECHNICAL FIELD

The present invention relates to a position and attitude estimation device, an image processing device, and a position and attitude estimation method, and relates, in particular, to a position and attitude estimation device that estimates a position and attitude by using a sensor, an image processing device, and a position and attitude estimation method.

BACKGROUND ART

A position and attitude estimation device that estimates a position and attitude of a moving object such as a spacecraft, a flying object, an unmanned aircraft, an unmanned automatic vehicle, or the like is known. PTL 1 to PTL 4, for example, describe related techniques.

FIG. 7 is a block diagram illustrating one example of a related moving object position and attitude estimation device 900 described in PTL 1. The related moving object position and attitude estimation device 900 is mounted on a moving object and estimates a position and attitude of the moving object on the basis of detection of each sensor. As illustrated in FIG. 7, the related moving object position and attitude estimation device 900 includes a gyro sensor 901 that outputs a gyro sensor detection signal 905 and a GPS (Global Positioning System) receiver 902 that outputs a GPS receiver output signal 906. Further, the moving object position and attitude estimation device 900 includes an acceleration sensor 903 that outputs an acceleration sensor detection signal 907 and an arithmetic control unit 904 that outputs a moving object position and attitude estimation device output signal 908.

In the related moving object position and attitude estimation device 900, from the GPS receiver output signal 906 output by the GPS receiver 902 and the acceleration sensor detection signal 907 output by the acceleration sensor 903, the arithmetic control unit 904 estimates a moving object position. In the moving object position and attitude estimation device 900, together therewith, from changes of the gyro sensor detection signal 905 output by the gyro sensor 901 and the GPS receiver output signal 906, the arithmetic control unit 904 estimates a moving object attitude and outputs, by collecting these, the moving object position and attitude estimation device output signal 908.

In PTL 1, in a compound navigation system, the arithmetic control unit 904 in FIG. 7 applies an error model in which a Kalman filter is extended to moving object motions represented by a nonlinear motion equation. This configuration makes it possible for the compound navigation system to effectively correct a detection value to a value close to a true value, even when using a light, small, and inexpensive sensor or the like, such as a MEMS (Micro Electro Mechanical System) sensor.

On the other hand, as one example of a related attitude measurement device, in a related attitude measurement technique described in, for example, PTL 2, it is unnecessary to update integration processing in propagation processing, a state estimation in time updating, and an error covariance for a state quantity thereof, based on a Kalman filter. Therefore, a processing content of the attitude measurement device becomes simpler, an attitude of an object can be measured in a short time, and further a cost of the attitude measurement device can be reduced.

Further, in a related technique described in, for example, PTL 3, regarding reference coordinate determination processing necessary for navigation calculation by a Kalman filter, a convergence state of the Kalman filter is monitored and appropriate compensation processing is executed. Thereby, even in a disturbed environment to some extent, it is possible to realize high accuracy/speeding up of reference coordinate determination processing and reduce a restriction in operations.

Further, in a related technique described in, for example, PTL 4, attitude angle error correction and azimuth angle error correction of a coordinate transformation matrix in Kalman filter processing are separated and further, in the azimuth angle error correction, a setting value of an azimuth angle is used. This makes it possible to execute alignment calculation of three axes in a short time and reduce an operation restriction.

CITATION LIST

Patent Literature

[PTL 1]
Japanese Laid-open Patent Publication No. 2007-276507 (paragraph 0007 and FIG. 1)
[PTL 2]
Japanese Laid-open Patent Publication No. 2006-38650 (paragraph 0070 and FIG. 1)
[PTL 3]
Japanese Laid-open Patent Publication No. 2001-264106 (paragraph 0021 and FIG. 1)
[PTL 4]
Japanese Patent No. 3919911 (paragraph 0065 and FIG. 1)

SUMMARY OF INVENTION

Technical Problem

In the related moving object position and attitude estimation device 900 as illustrated in FIG. 7, on the basis of detection signals of the GPS receiver 902, the acceleration sensor 903, and the gyro sensor 901, the arithmetic control unit 904 estimates a position and attitude at a constant cycle (timing). The moving object position and attitude estimation device 900 obtains desired estimation accuracy at this cycle of position and attitude estimation processing. However, in this related technique, there is a problem that it is difficult to enhance estimation accuracy of a position and attitude at a cycle (timing) of position and attitude estimation processing only by the arithmetic control unit 904.

In view of such a problem, an object of the present invention is to provide a position and attitude estimation device capable of enhancing estimation accuracy of a position and attitude, an image processing device, and a position and attitude estimation method.

Solution to Problem

A position and attitude estimation device according to the present invention includes: first detection means configured to detect a plurality of first position and attitude parameters pertaining to a position and attitude of a moving object; first position and attitude estimation means configured to estimate a first position and attitude of the moving object at a first timing, based on the plurality of detected first position and attitude parameters; second detection means configured to detect a plurality of second position and attitude parameters pertaining to a position and attitude of the moving object; second position and attitude estimation means configured to estimate a second position and attitude of the moving object at a second timing different from the first timing, based on the plurality of detected second position and attitude parameters; and position and attitude output means configured to output a third position and attitude, based on the estimated first position and attitude and the estimated second position and attitude.

An image processing device according to the present invention includes: moving object position and attitude estimation means configured to estimate a position and attitude of a moving object; and image processing means configured to execute, based on the estimated position and attitude, image processing for a signal observed by a radar mounted on the moving object, wherein the moving object position and attitude estimation means including first detection means configured to detect a plurality of first position and attitude parameters pertaining to a position and attitude of the moving object, first position and attitude estimation means configured to estimate a first position and attitude of the moving object at a first timing, based on the plurality of detected first position and attitude parameters, second detection means configured to detect a plurality of second position and attitude parameters pertaining to a position and attitude of the moving object, second position and attitude estimation means configured to estimate a second position and attitude of the moving object at a second timing different from the first timing, based on the plurality of detected second position and attitude parameters, and position and attitude output means configured to output a third position and attitude to the image processing means, based on the estimated first position and attitude and the estimated second position and attitude.

A position and attitude estimation method according to the present invention includes: detecting a plurality of first position and attitude parameters pertaining to a position and attitude of a moving object; estimating a first position and attitude of the moving object at a first timing, based on the plurality of detected first position and attitude parameters; detecting a plurality of second position and attitude parameters pertaining to the position and attitude of the moving object; estimating a second position and attitude of the moving object at a second timing different from the first timing, based on the plurality of detected second position and attitude parameters; and outputting a third position and attitude, based on the estimated first position and attitude and the estimated second position and attitude.

Advantageous Effects of Invention

According to the present invention, it is possible to provide a position and attitude estimation device capable of enhancing estimation accuracy of a position and attitude, an image processing device, and a position and attitude estimation method.

DESCRIPTION OF EMBODIMENTS

Summary of an Exemplary Embodiment

Figure 1:
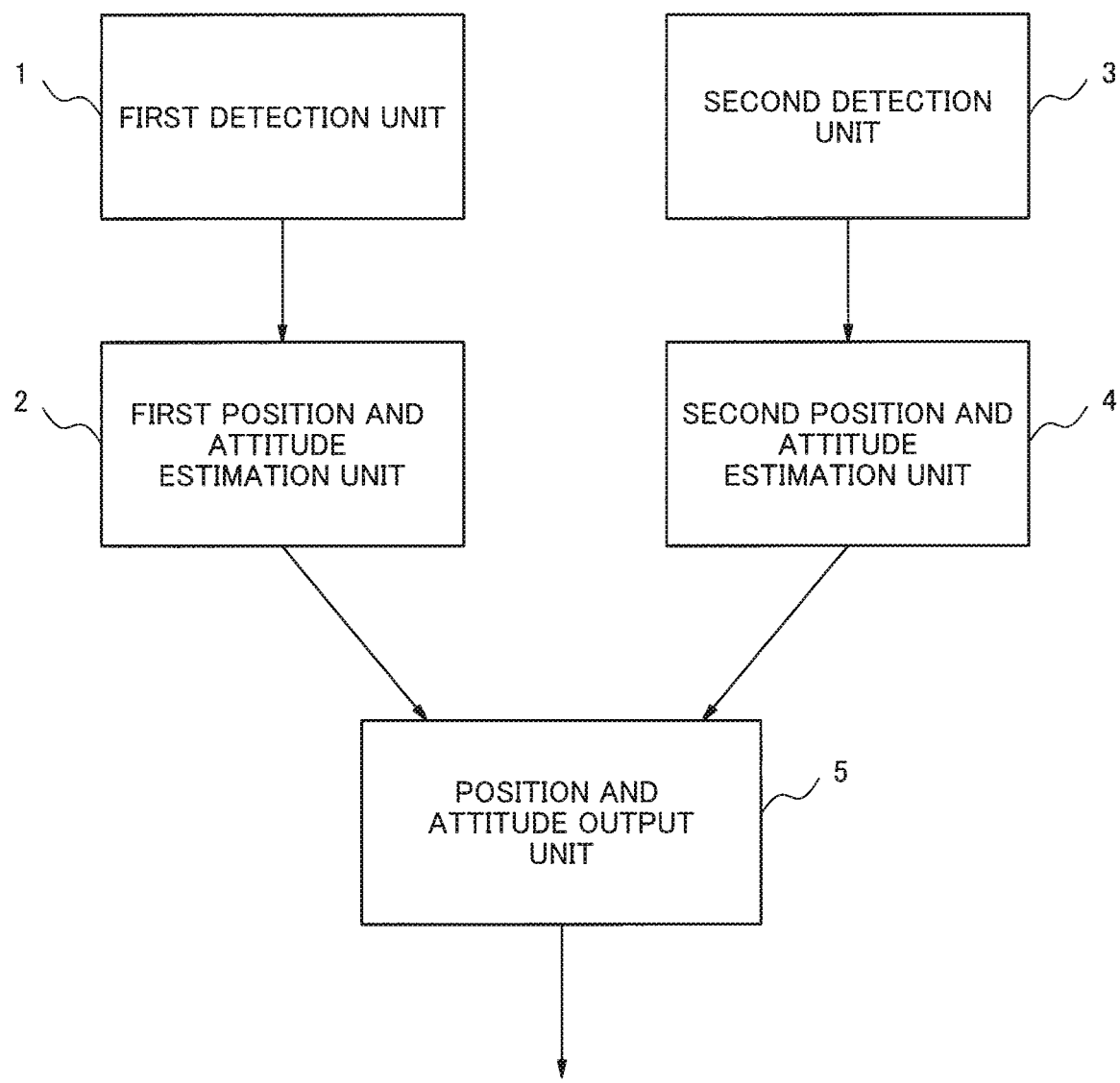
FIG. 1 is a configuration diagram illustrating an outline of a position and attitude estimation device according to an exemplary embodiment.

FIG. 1 is a configuration diagram illustrating an outline of a position and attitude estimation device 10 according to an exemplary embodiment. As illustrated in FIG. 1, the position and attitude estimation device 10 according to the exemplary embodiment includes a first detection unit 1, a first position and attitude estimation unit 2, a second detection unit 3, a second position and attitude estimation unit 4, and a position and attitude output unit 5.

The first detection unit 1 detects a plurality of first position and attitude parameters pertaining to a position and attitude of a moving object. The first position and attitude estimation unit 2 estimates a first position and attitude of the moving object at a first timing on the basis of the plurality of first position and attitude parameters detected by the first detection unit 1. The second detection unit 3 detects a plurality of second position and attitude parameters pertaining to the position and attitude of the moving object. The second position and attitude estimation unit 4 estimates a second position and attitude of the moving object at a second timing different from the first timing on the basis of the plurality of second position and attitude parameters detected by the second detection unit 3. The position and attitude output unit 5 outputs a third position and attitude on the basis of the estimated first position and attitude and second position and attitude.

In this manner, positions and attitudes of a moving object are estimated at a first timing and a second timing, respectively, and a third position and attitude is output on the basis of these estimated positions and attitudes. Thereby, it is possible to further enhance estimation accuracy of a position and attitude, compared with a case in which a position and attitude is estimated only by the first and second position and attitude estimation units.

Figure 7:
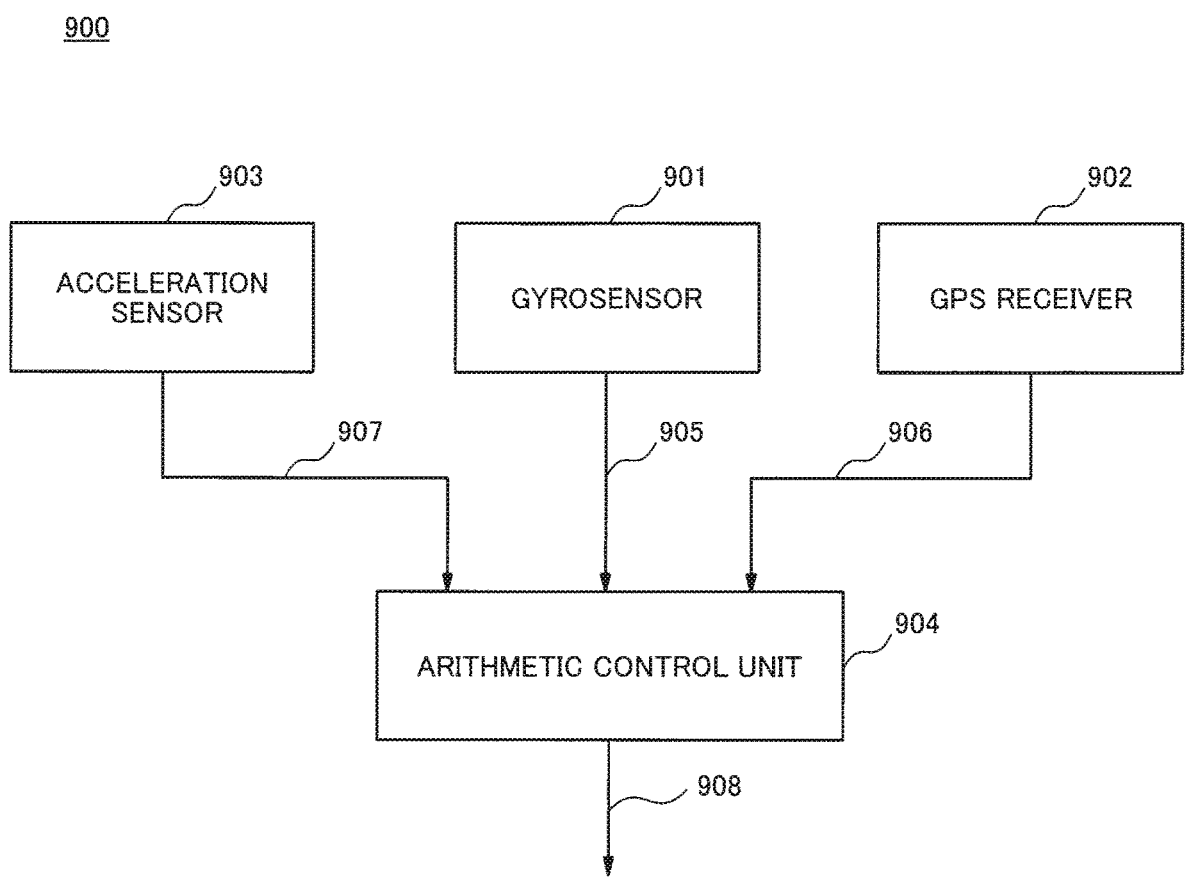
FIG. 7 is a block diagram illustrating a configuration of a related position and attitude estimation device.

Specific problems of the related techniques are described below. In the moving object position and attitude estimation device (PTL 1) as illustrated in FIG. 7, a mounted sensor includes only three types of sensors that are the GPS receiver 902, the acceleration sensor 903, and the gyro sensor 901. Therefore, there is a problem that specifically, attitude estimation accuracy depends on single-unit detection performance of the gyro sensor 901 applied, and attainable estimation accuracy is limited even when error model accuracy in a Kalman filter is enhanced.

Further, in the technique described in PTL 2, as sensors, only a triaxial acceleration sensor and a triaxial gyro are applied, and attitude estimation is realized by Kalman filer processing using these sensors. Therefore, there is a disadvantage that attitude estimation accuracy derived therefrom depends on an accuracy balance generated between detection performance of the triaxial gyro and accuracy of an error model configuring the Kalman filter, and therefore it is difficult to ensure absolute attitude accuracy.

On the other hand, in the technique described in PTL 3, while being a Kalman filter including a gyro sensor and an acceleration sensor, a configuration itself is not a configuration for eliminating an estimation error but is consistently a configuration for monitoring a convergence status of the Kalman filter. Therefore, an application purpose of the Kalman filter is different from that of the present invention.

Further, in the technique described in PTL 4, only an azimuth angle error correction portion in which it is difficult to ensure accuracy in attitude angle error correction is purposely separated, and after another attitude angle error correction value is obtained, azimuth angle error correction is sequentially executed. Therefore, there is a problem that an obtained azimuth angle error correction value results in dependence on accuracy of an attitude angle error correction value as a basis, and therefore it is difficult to ensure orthogonality (independence) of triaxial attitude information.

In view of the problems of the related techniques, in the following exemplary embodiments, it is possible to highly accurately estimate a position and attitude of a moving objet such as a spacecraft, a flying object, an unmanned airplane, an unmanned automobile, or the like. Specifically, it is possible to provide an attitude estimation device of a moving object-mounted instrument capable of sequentially estimating with high accuracy a current attitude of a drive instrument mounted on a moving object by explicitly combining a position and attitude estimation device mounted on a moving object main body and an attitude estimation device attached to the mounted drive instrument.

First Exemplary Embodiment

Hereinafter, with reference to the accompanying drawings, a first exemplary embodiment will be described. In the present exemplary embodiment, an example in which in a moving object mounted with a radar device, a position and attitude of the moving object, in particular, a position and attitude of a mounted radar antenna is estimated will be described.

Figure 2:
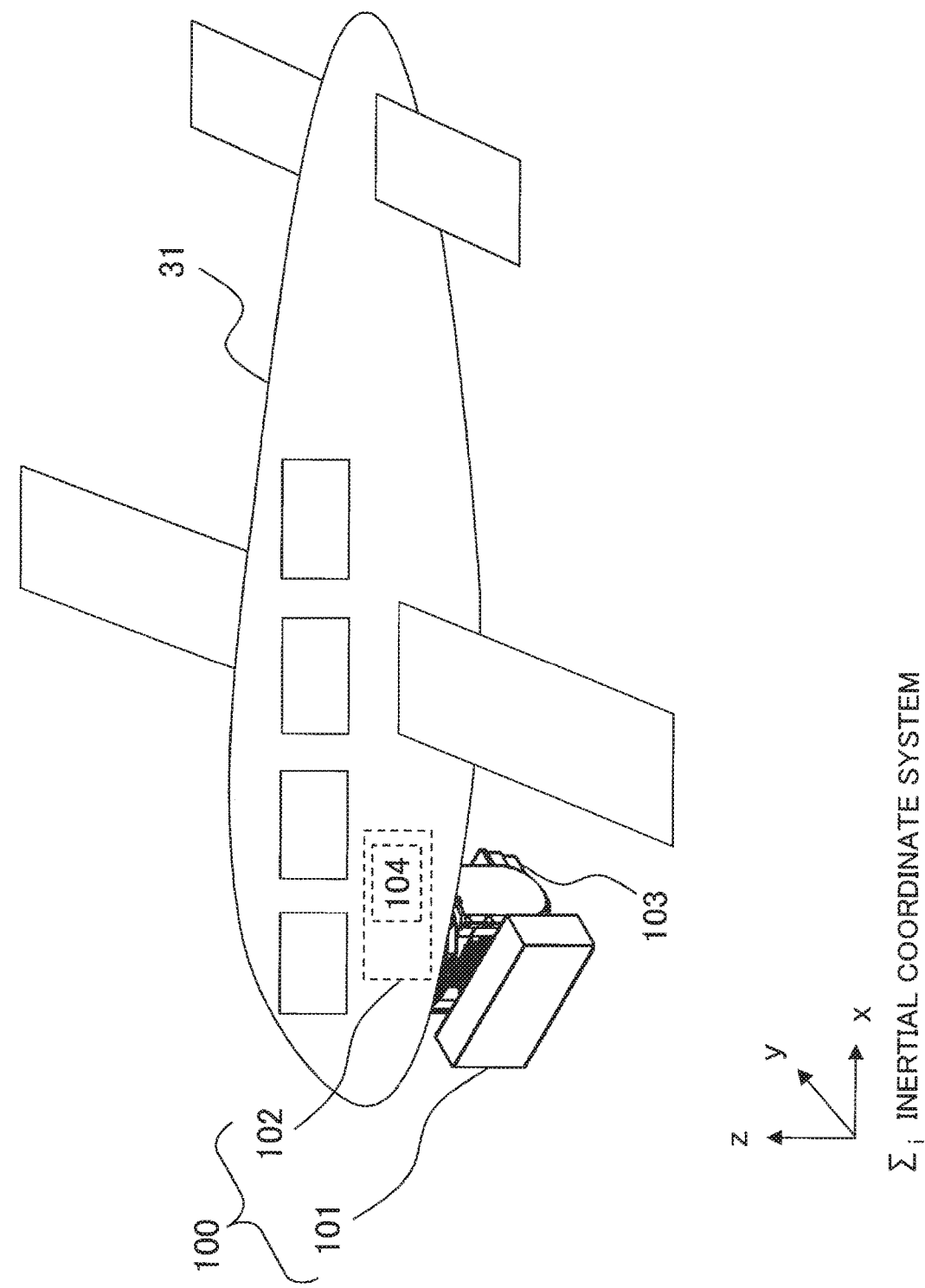
FIG. 2 is a schematic diagram schematically illustrating a moving object according to a first exemplary embodiment.

FIG. 2 schematically illustrates a moving object 30 according to the present exemplary embodiment. The moving object 30 according to the present exemplary embodiment is a spacecraft, a flying object, an unmanned airplane, an unmanned automobile, or the like and is, for example, a small airplane or a helicopter. The moving object 30 is mounted with a radar device 100 and observes a state of the surface of the ground and the like while moving. The radar device 100 is a SAR (Synthetic Aperture Radar) as one example. The synthetic aperture radar reproduces an observation image on the basis of a position and attitude of an antenna (moving object) from data (complex data) of an amplitude and a phase of a reception wave obtained by the antenna and interprets a state of the surface of the ground. The synthetic aperture radar is used, and therefore it is necessary to accurately estimate, specifically, a position and attitude of the antenna. The radar device 100 is not limited to a synthetic aperture radar and may be another radar such as a search radar or the like.

The radar device 100 mainly includes an antenna unit 101 including an antenna and a signal processing unit 102 that executes signal processing for an electric wave transmitted/received by the antenna. The antenna unit 101 is disposed, for example, in a front lower portion of a fuselage 31 of the moving object 30 and irradiates electric waves toward the surface of the ground under the fuselage 31 from the antenna. The signal processing unit 102 is disposed inside the fuselage 31 of the moving object 30 and displays, in real time, an observation image observed via the antenna. Further, the fuselage 31 of the moving object 30 includes a fuselage sensor 104 that detects a position, a velocity, and an angular velocity of the fuselage 31, and the antenna unit 101 includes an antenna sensor 103 that detects a position, a velocity, and an angular velocity of the antenna.

Figure 3:
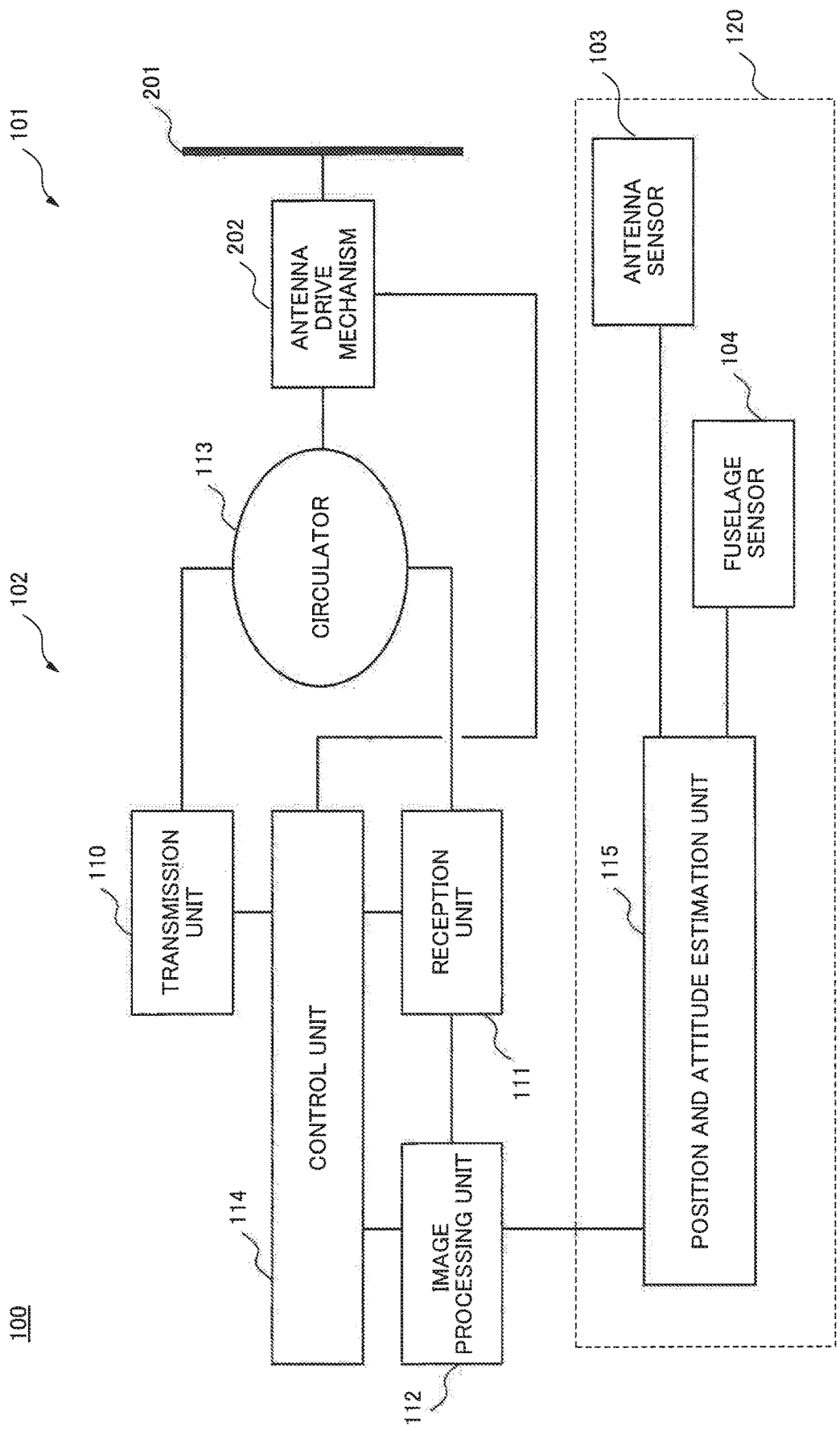
FIG. 3 is a block diagram illustrating a configuration of a radar device according to the first exemplary embodiment.

FIG. 3 illustrates function blocks of the radar device 100 according to the present exemplary embodiment. As illustrated in FIG. 3, the radar device 100 according to the present exemplary embodiment includes a transmission unit 110, a reception unit 111, an image processing unit 112, a circulator 113, a control unit 114, a position and attitude estimation unit 115, an antenna 201, an antenna drive mechanism 202, an antenna sensor 103, and a fuselage sensor 104.

The antenna unit 101 of FIG. 2 includes, for example, an antenna 201, an antenna drive mechanism 202, and an antenna sensor 103, and the signal processing unit 102 of FIG. 2 includes a transmission unit 110, a reception unit 111, an image processing unit 112, a circulator 113, a control unit 114, a position and attitude estimation unit 115, and a fuselage sensor 104. Further, the antenna sensor 103, the fuselage sensor 104, and the position and attitude estimation unit 115 configure a position and attitude estimation device 120 that estimates a position and attitude of the moving object 30 (antenna). Further, it can be said that the position and attitude estimation device 120 and the image processing unit 112 configure an image processing device that generates an observation image (SAR image) of a radar.

The transmission unit 110 generates a transmission signal for performing observation in a synthetic aperture radar. The circulator 113 transmits the transmission signal generated by the transmission unit 110 from the antenna 201 and outputs a reception signal received by the antenna 201 to the reception unit 111. The antenna drive mechanism 202 drives the antenna 201 so as to be in an optimum direction or position in accordance with control of the control unit 114. The antenna 201 transmits a transmission wave (transmission signal) to an observation target and receives a reception wave (reception signal) reflected from the observation target.

The fuselage sensor 104 detects a movement, an attitude (a displacement in pitch, roll, and yaw), a vibration, and the like of the fuselage 31 of the moving object 30. The fuselage sensor 104 detects, for example, a position, an acceleration, and an angular velocity as position and attitude parameters pertaining to a position and attitude of the moving object 30. The antenna sensor 103 detects a movement and a vibration of the moving object 30 and a displacement of the antenna 201 displaced in accordance with drive of the antenna drive mechanism 202. The antenna sensor 103 detects, for example, a position, an acceleration, and an angular velocity as position and attitude parameters pertaining to a position and attitude of the antenna (moving object). In other words, the antenna sensor 103 and the fuselage sensor 104 include, as described later, a GPS receiver, an acceleration sensor, and a sensor such as a gyro sensor or the like.

The reception unit 111 executes signal processing for a reception signal received by the antenna 201 and generates a signal processable by the image processing unit 112. The control unit 114 is a control unit that controls each unit of the radar device and controls the antenna drive mechanism 202 and the like on the basis of detection results of the antenna sensor 103 and the fuselage sensor 104 or an observation result of the image processing unit 112.

The position and attitude estimation unit 115 (position and attitude estimation device 120) estimates a position and attitude of the moving object 30 (antenna) on the basis of detection of the antenna sensor 103 and the fuselage sensor 104. The image processing unit 112 executes, using the position and attitude (attitude interpolation estimation value) estimated by the position and attitude estimation unit 115, image processing for the reception signal processed by the reception unit 111, detects an observation target, and generates and displays an observation image. It is possible that, for example, the image processing unit 112 outputs a timing (cycle) for executing image processing to the position and attitude estimation unit 115, and the position and attitude estimation unit 115 outputs a position and attitude estimation result in synchronization with this timing of image processing.

Figure 4:
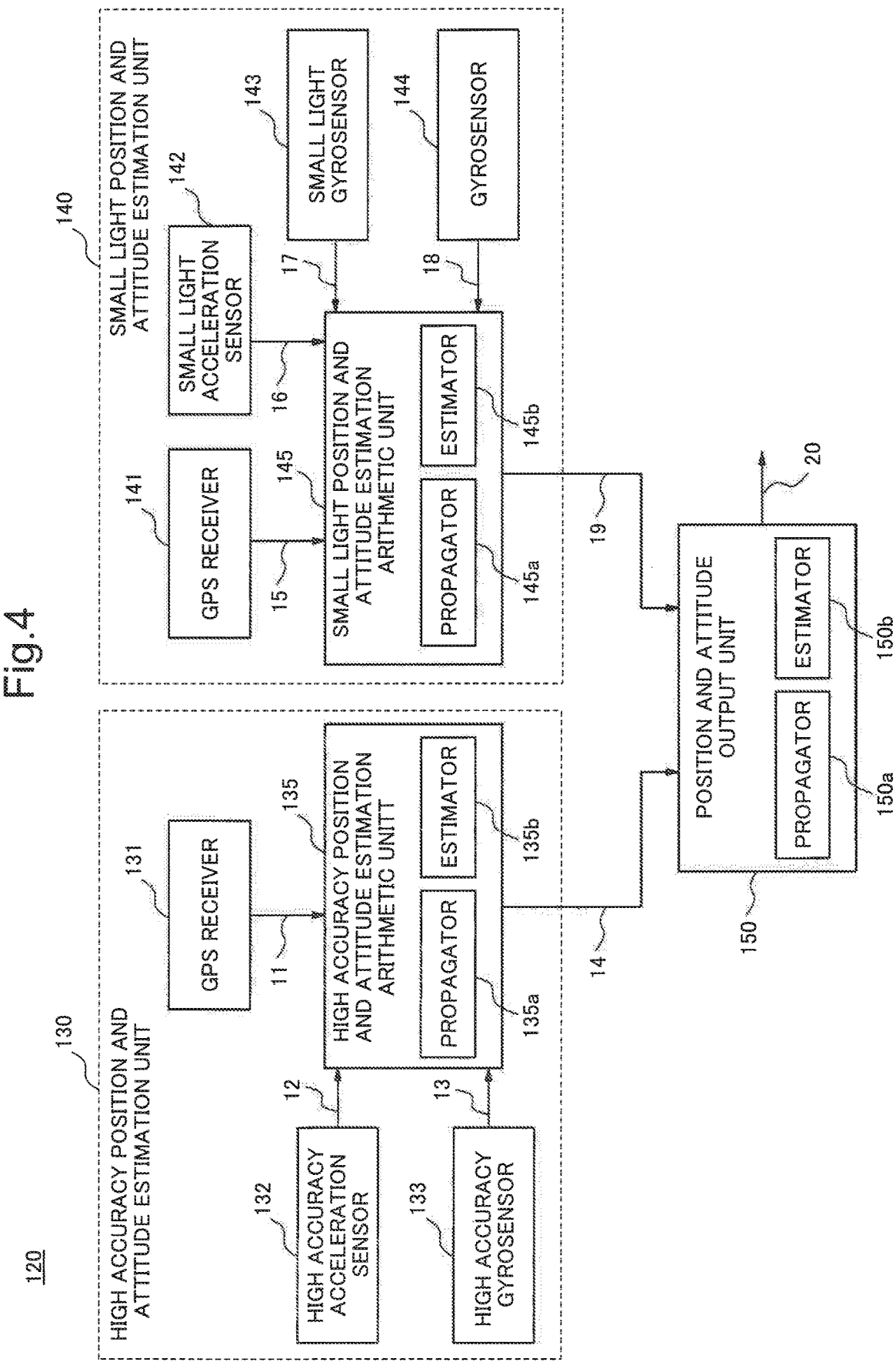
FIG. 4 is a block diagram illustrating a configuration of a position and attitude estimation device according to the first exemplary embodiment.

FIG. 4 is a block diagram illustrating a configuration of a position and attitude estimation device 120 according to the present exemplary embodiment. As illustrated in FIG. 4, the position and attitude estimation device 120 according to the present exemplary embodiment includes a high accuracy position and attitude estimation unit 130, a small light position and attitude estimation unit 140, and a position and attitude output unit 150. The position and attitude estimation unit 115 of FIG. 3 includes, for example, a high accuracy position and attitude estimation arithmetic unit 135 of the high accuracy position and attitude estimation unit 130, a small light position and attitude estimation arithmetic unit 145 of the small light position and attitude estimation unit 140, and the position and attitude output unit 150.

The high accuracy position and attitude estimation unit 130 is an estimation unit that estimates a position and attitude more highly accurately than the small light position and attitude estimation unit 140. The high accuracy position and attitude estimation unit 130 is, for example, a device larger than the small light position and attitude estimation unit 140. The high accuracy position and attitude estimation unit 130 estimates a position and attitude of a fuselage on the basis of detection of the fuselage sensor 104. The high accuracy position and attitude estimation unit 130 includes a GPS receiver 131, a high accuracy acceleration sensor 132, a high accuracy gyro sensor 133, and a high accuracy position and attitude estimation arithmetic unit 135.

The fuselage sensor (a first detection unit) 104 includes a GPS receiver 131, a high accuracy acceleration sensor 132, and a high accuracy gyro sensor 133. The GPS receiver 131 detects an absolute position of the fuselage and outputs a moving object absolute position detection signal 11 including the detected absolute position to the high accuracy position and attitude estimation arithmetic unit (a first position and attitude estimation unit) 135. The high accuracy acceleration sensor 132 detects an acceleration of the fuselage and outputs a moving object acceleration detection signal 12 including the detected acceleration to the high accuracy position and attitude estimation arithmetic unit (the first position and attitude estimation unit) 135.

The high accuracy gyro sensor 133 detects an angular velocity of the fuselage and outputs a moving object attitude angular velocity detection signal 13 including the detected angular velocity to the high accuracy position and attitude estimation arithmetic unit (the first position and attitude estimation unit) 135. The high accuracy acceleration sensor 132 and the high accuracy gyro sensor 133 are, for example, sensors more accurate and larger than sensors (the small light acceleration sensor 142, the small light gyro sensor 143, and the gyro sensor) of the small light position and attitude estimation unit 140.

The high accuracy position and attitude estimation arithmetic unit (the first position and attitude estimation unit) 135 estimates a position and attitude of a moving object (fuselage) on the basis of the absolute position, the acceleration, and the angular velocity detected by the GPS receiver 131, the high accuracy acceleration sensor 132, and the high accuracy gyro sensor 133, respectively. The high accuracy position and attitude estimation arithmetic unit (the first position and attitude estimation unit) 135 outputs a moving object high accuracy position and attitude estimation signal 14 including the estimated position and attitude (position and attitude propagation value). The high accuracy position and attitude estimation arithmetic unit 135 is an arithmetic unit such as a personal computer and the like. The high accuracy position and attitude estimation arithmetic unit 135 may be the same device as the image processing unit. The high accuracy position and attitude estimation arithmetic unit 135 estimates a position and attitude of the fuselage from the absolute position detected by the GPS receiver 131, the acceleration detected by the high accuracy acceleration sensor 132, and the angular velocity detected by the high accuracy gyro sensor 133 and outputs a moving object high accuracy position and attitude estimation signal 14 including the estimated position and attitude (position and attitude propagation value).

The high accuracy position and attitude estimation arithmetic unit 135 executes Kalman filter processing using the acceleration detected by the high accuracy acceleration sensor 132 and the angular velocity detected by the high accuracy gyro sensor 133, for example, using the position detected by the GPS receiver 131 as a reference. Thereby, the high accuracy position and attitude estimation arithmetic unit 135 estimates a position and attitude of a first timing (cycle). The high accuracy position and attitude estimation arithmetic unit 135 estimates a position and attitude, for example, at a cycle of 50 to 200 Hz and outputs a moving object high accuracy position and attitude estimation signal 14. The cycle for estimating a position and attitude by the high accuracy position and attitude estimation arithmetic unit 135 is longer than that of the small light position and attitude estimation unit 140. The high accuracy position and attitude estimation arithmetic unit 135 includes a propagator 135a that outputs the position and attitude (position and attitude propagation value) calculated by Kalman filter processing on the basis of values of the detected acceleration and angular velocity. Further, the high accuracy position and attitude estimation arithmetic unit 135 includes an estimator 135b that estimates a position and attitude upon detecting a next acceleration and angular velocity on the basis of the output position and attitude (position and attitude propagation value) and the position detected by the GPS receiver.

The small light position and attitude estimation unit 140 is lower than the high accuracy position and attitude estimation unit 130 in accuracy of an estimated position and attitude. Further, the small light position and attitude estimation unit 140 is, for example, a position and attitude estimation device smaller and lighter than the high accuracy position and attitude estimation unit 130. The small light position and attitude estimation unit 140 estimates, on the basis of an absolute position, an acceleration, and an angular velocity detected by the antenna sensor 103 disposed, for example, in the antenna, a position and attitude of the antenna. The small light position and attitude estimation unit 140 includes a GPS receiver 141, a small light acceleration sensor 142, a small light gyro sensor 143, a gyro sensor 144, and a small light position and attitude estimation arithmetic unit 145. In this example, while in order to perform observation in a synthetic aperture radar, it is preferable for the small light position and attitude estimation unit 140 to estimate, on the basis of a sensor disposed in an antenna, a position and attitude of the antenna, the present invention is not limited thereto, and the small light position and attitude estimation unit 140 may estimate, on the basis of a sensor disposed in a fuselage (moving object), a position and attitude of the fuselage (moving object).

The antenna sensor (a second detection unit) 103 disposed in the antenna includes a GPS receiver 141, a small light acceleration sensor 142, a small light gyro sensor 143, and a gyro sensor 144. The GPS receiver 141 detects an absolute position of the antenna and outputs an absolute position detection signal 15 including the detected absolute position to the small light position and attitude estimation arithmetic unit (a second position and attitude estimation unit) 145. The small light acceleration sensor 142 detects an acceleration of the antenna and outputs a small light acceleration sensor detection signal 16 including the detected acceleration to the small light position and attitude estimation arithmetic unit (the second position and attitude estimation unit) 145.

The small light gyro sensor 143 detects an angular velocity of the antenna and outputs a small light gyro sensor detection signal 17 including the detected angular velocity to the small light position and attitude estimation arithmetic unit (the second position and attitude estimation unit) 145. The gyro sensor 144 detects an angular velocity of the antenna and outputs a gyro sensor detection signal 18 including the detected angular velocity to the small light position and attitude estimation arithmetic unit (the second position and attitude estimation unit) 145.

The GPS receiver 141 is the same sensor as the GPS receiver 131 of the high accuracy position and attitude estimation unit 130. The small light acceleration sensor 142 and the small light gyro sensor 143 are sensors that are smaller and lighter and less accurate than the high accuracy acceleration sensor 132 and the high accuracy gyro sensor 133 of the high accuracy position and attitude estimation unit 130, respectively. The gyro sensor 144 is a medium-sized sensor and a sensor more accurate than the small light gyro sensor 143. While it is preferable that the antenna sensor (the second detection unit) 103 include the gyro sensor 144 and the gyro sensor 144 complement detection accuracy of the small light gyro sensor 143, the antenna sensor (the second detection unit) 103 may include only the small light gyro sensor 143 without the gyro sensor 144.

The small light position and attitude estimation arithmetic unit (the second position and attitude estimation unit) 145 estimates a position and attitude of the antenna on the basis of the absolute position detected by the GPS receiver 141, the acceleration detected by the small light acceleration sensor 142, the angular velocity detected by the small light gyro sensor 143, and the angular velocity detected by the gyro sensor 144 and outputs a small light position and attitude estimation arithmetic unit generation signal 19 including the estimated position and attitude (position and attitude propagation value). The small light position and attitude estimation arithmetic unit (the second position and attitude estimation unit) 145 may estimate, without the GPS receiver 141, a position and attitude on the basis of the absolute position detected by the GPS receiver 131 of the high accuracy position and attitude estimation unit 130. The small light position and attitude estimation arithmetic unit 145 is a small arithmetic device such as a semiconductor device including a CPU.

The small light position and attitude estimation arithmetic unit 145 execute, using the position detected by the GPS receiver 141 as a reference, Kalman filter processing using the acceleration detected by the small light acceleration sensor 142, the angular velocity detected by the small light gyro sensor 143, and the angular velocity detected by the gyro sensor 144. Thereby, the small light position and attitude estimation arithmetic unit 145 estimates a position and attitude of a second timing (cycle). The small light position and attitude estimation arithmetic unit 145 estimates a position and attitude, for example, at a cycle of 400 Hz. The cycle for estimating a position and attitude by the small light position and attitude estimation arithmetic unit 145 is longer than that of the high accuracy position and attitude estimation unit 130. The small light position and attitude estimation arithmetic unit 145 includes a propagator 145a that outputs a position and attitude (position and attitude propagation value) obtained on the basis of values of the detected acceleration and angular velocities and an estimator 145b that estimates a position and attitude upon detecting next acceleration and angular velocities on the basis of the output position and attitude (position and attitude propagation value) and the position detected by the GPS receiver.

The position and attitude output unit 150 estimates a position and attitude of a moving object (antenna) on the basis of the position and attitude output from the high accuracy position and attitude estimation unit 130 and the position and attitude output from the small light position and attitude estimation unit 140 and outputs a position and attitude interpolation estimation value 20 including the estimated position and attitude. The position and attitude output unit 150 may execute the output by including the positions and attitudes estimated by the high accuracy position and attitude estimation unit 130 and the small light position and attitude estimation unit 140. The position and attitude output unit 150 is an arithmetic unit such as a personal computer or the like. The position and attitude output unit 150 may be the same device as the high accuracy position and attitude estimation arithmetic unit 135 or the image processing unit. At that time, the position and attitude output unit 150 generates a position and attitude interpolation estimation value 20 to be an interpolation value for the position and attitude (position and attitude propagation value) output by the high accuracy position and attitude estimation arithmetic unit 135 and the position and attitude (position and attitude propagation value) output by the small light position and attitude estimation arithmetic unit 145.

The position and attitude output unit 150 executes (virtual) Kalman filter processing, using any one of the position and attitude output by the high accuracy position and attitude estimation arithmetic unit 135 and the position and attitude output by the small light position and attitude estimation arithmetic unit 145 as a reference, using the other position and attitude. Thereby, the position and attitude output unit 150 estimates a position and attitude at a third timing (cycle). In other words, the position and attitude output unit 150 outputs a third position and attitude on the basis of a first position and attitude (e.g. the position and attitude output by the high accuracy position and attitude estimation arithmetic unit 135) and a second position and attitude (e.g. the position and attitude output by the small light position and attitude estimation arithmetic unit 145). The position and attitude output unit 150 outputs the third position and attitude on the basis of the first position and attitude output by the high accuracy position and attitude estimation arithmetic unit 135 at the first timing. At the second timing, the position and attitude output unit 150 outputs the third position and attitude on the basis of the second position and attitude output by the small light position and attitude estimation arithmetic unit 145. At the third timing different from any one of the first timing and the second timing, the position and attitude output unit 150 outputs the third position and attitude of a moving object on the basis of the first position and attitude output by the high accuracy position and attitude estimation arithmetic unit 135 or the second position and attitude output by the small light position and attitude estimation arithmetic unit 145. A cycle at which the position and attitude output unit 150 estimates a position and attitude and outputs an attitude interpolation estimation value 20 is, for example, 3 KHz. A cycle at which the position and attitude output unit 150 outputs a position and attitude is shorter than cycles at which the high accuracy position and attitude estimation unit 130 and the small light position and attitude estimation unit 140 estimate positions and attitudes. The position and attitude output unit 150 includes a propagator 150a that outputs a position and attitude (position and attitude propagation value) calculated by Kalman filter processing and an estimator 150b that estimates, on the basis of the output position and attitude (position and attitude propagation value) and a position estimated by the high accuracy position and attitude estimation unit 130 or the small light position and attitude estimation unit 140, a position and attitude at a next estimation time.

Next, using FIG. 5, an operation of the position and attitude estimation device 120 according to the present exemplary embodiment will be described.

As a specific example, as described above, the moving object 30 is mounted, on a fuselage main body, with a GPS receiver 131, a high accuracy acceleration sensor 132, a high accuracy gyro sensor 133, and a high accuracy position and attitude estimation arithmetic unit 135. Further, the moving object 30 is mounted, at an antenna tip (or on a rear side), with a GPS receiver 141, a small light acceleration sensor 142, a small light gyro sensor 143, a gyro sensor 144, and a small light position and attitude estimation arithmetic unit 145. A direction of the antenna can be freely driven in the space. The position and attitude estimation device 120 estimates and generates attitude angle information of the antenna at a high sampling frequency of an order of several kHz. However, the moving object 30 is mounted with the GPS receiver 131, the high accuracy acceleration sensor 132, and the high accuracy gyro sensor 133, for example, in the vicinity of the center of gravity of the moving object 30. Further, the directional antenna mounted, in an antenna rear portion, with the GPS receiver 141, the small light acceleration sensor 142, the small light gyro sensor 143, the gyro sensor 144, and the small light position and attitude estimation arithmetic unit 145 is disposed, for example, at a tip of the fuselage of the moving object 30.

Figure 5:
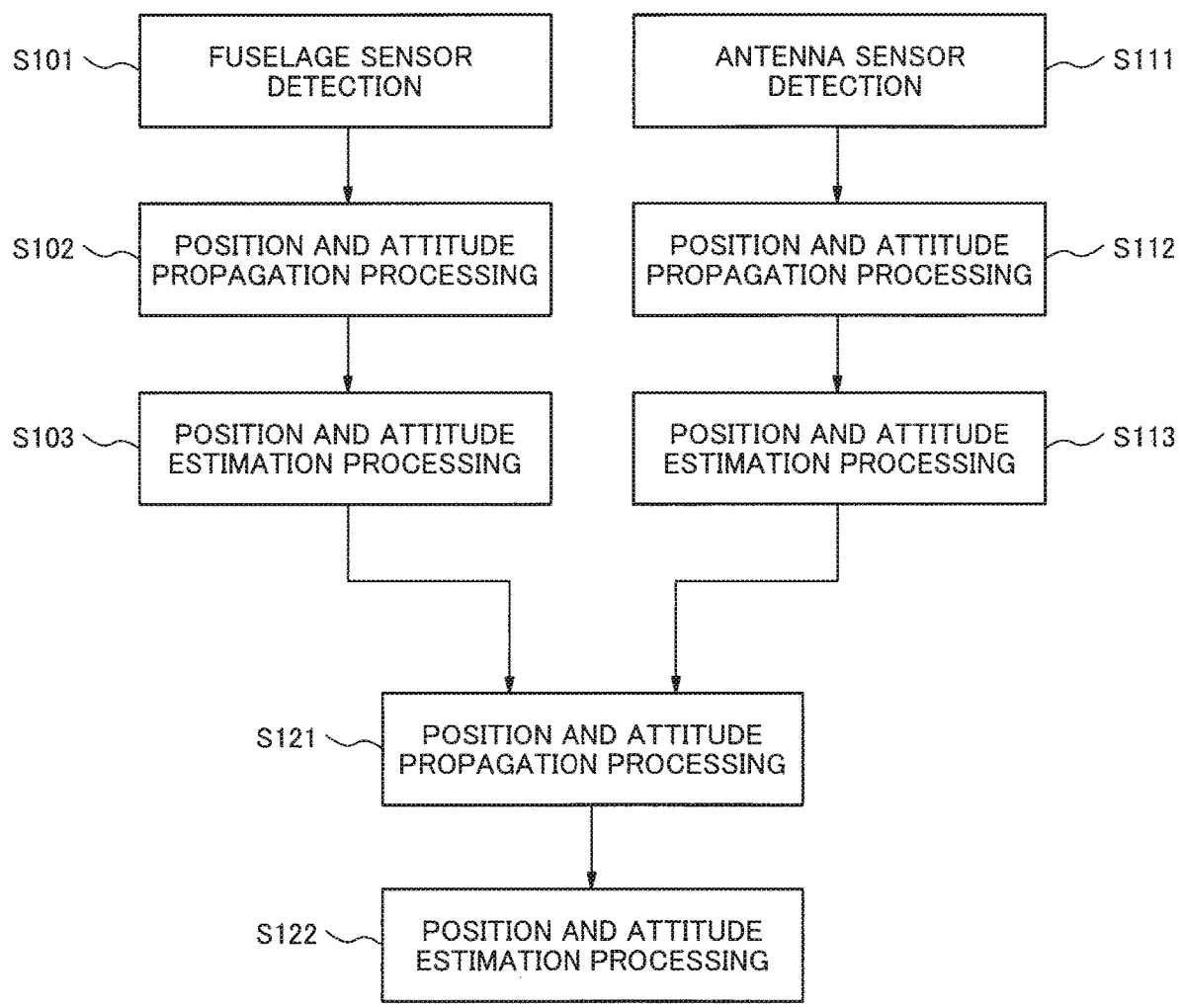
FIG. 5 is a flowchart illustrating an operation of the position and attitude estimation device according to the first exemplary embodiment.

As illustrated in FIG. 5, first, in the high accuracy position and attitude estimation unit 130, the GPS receiver 131, the high accuracy acceleration sensor 132, and the high accuracy gyro sensor 133 perform detection (S101), the high accuracy position and attitude estimation arithmetic unit 135 (the propagator 135a) executes position and attitude propagation processing (S102), and the high accuracy position and attitude estimation arithmetic unit 135 (the estimator 135b) executes position and attitude estimation processing (Kalman filter processing) (S103).

In the Kalman filter processing used by the high accuracy position and attitude estimation arithmetic unit 135, for example, a vector $^0z_n$ and a vector $^0x_n$ represented by the following equations (1) and (2), respectively, are designated as an observation quantity and a state quantity.

$$^0z_n(\Delta^0 p\ \Delta^0 p' \Delta^0 \theta) \tag{1}$$

$$^0x_n(\Delta^0 p\ \Delta^0 p' \Delta^0 \theta \Delta^0 a_b \Delta^0 \omega_b) \tag{2}$$

wherein $\Delta^0 p$ is an error vector of a current position vector p=(x y z) of the moving object 30 described in the inertial coordinate system of FIG. 2. Further, $\Delta^0 p'$ is an error vector of a velocity vector p'=(x' y' z') of the moving object 30 described in the inertial coordinate system of FIG. 2. Further, $\Delta^0 \theta$ is an error vector of an attitude vector θ=(φ ρ Ψ) of the moving object 30 described in the inertial coordinate system of FIG. 2. Further, $\Delta^0 a_b$ is an error vector with respect to a noise vector $a_b=(a_{bx}\ a_{by}\ a_{bz})$ indicating bias noise of the high accuracy acceleration sensor 132 of the moving object 30 described in the inertial coordinate system of FIG. 2. Further, $\Delta^0 \omega_b$ is an error vector with respect to a noise vector $\omega_b=(\omega_{bx}\ \omega_{by}\ \omega_{bz})$ indicating bias noise of the high accuracy gyro sensor 133 of the moving object 30 described in the inertial coordinate system of FIG. 2. The error vector refers to a vector representing an error of a value calculated from values detected by an acceleration sensor or a gyro sensor with respect to a reference value (an absolute true value of each state quantity). Regarding the current position vector p, a difference between a detection value and a reference value can be set as an error vector in which a value directly detected by the GPS receiver 131 is designated as the detection value and a position after Kalman filter processing predicted upon previous detection is set as the reference value. Regarding the velocity vector p', a value obtained by integrating detection values of the high accuracy acceleration sensor 132 is set as a detection value. A reference value is calculated from a velocity after Kalman filter processing predicted upon the previous detection and a velocity calculated from the detection value of the GPS receiver 131. A difference between the detection value and the reference value can be set as an error vector. Regarding the attitude vector θ, a value obtained by integrating detection values of the high accuracy gyro sensor 133 is set as a detection value. A reference value is calculated from an attitude after Kalman filter processing predicted upon the previous detection and an attitude derived from position dynamics of a moving object (airplane) on the basis of the detection value of the GPS receiver 131. A difference between the detection value and the reference value can be set as an error vector. It is possible that the moving object (airplane) includes a compass, and an azimuth angle detected by the compass is set as a reference. Further, it is possible that a measurement instrument that measures an inclination of the fuselage to a gravity direction is provided, and a measurement value of the inclination is set as a reference.

Further, linear stochastic systems (state space models) of a state quantity $^0x_{n+1}$ at a time $t_{n+1}$ (upon next detection) and an observation quantity $^0z_n$ at a time $t_n$ (upon current detection) used in Kalman filter processing used by the high accuracy position and attitude estimation arithmetic unit 135 are represented, for example, as in following Equations (3) and (4).

$$^0x_{n+1} = {^0\Phi_n}\ ^0x_n + {^0G_n}\ ^0w_n + {^0D_n}\ ^0u_n \tag{3}$$

$$^0z_n = {^0H_n}\ ^0x_n + {^0v_n} \tag{4}$$

wherein $^0x_n$ is a state quantity at a time $t_n$ (upon current detection), $^0\Phi_n$ is a state transition matrix at the time $t_n$, $^0G_n$ is a drive noise matrix at the time $t_n$, $^0u_n$ is a system noise at the time $t_n$, $^0D_n$ is a drive input matrix at the time $t_n$, $^0u_n$ is a system input vector at the time $t_n$, $^0H_n$ is an observation matrix at the time $t_n$, and $^0v_n$ is an observation noise at the time $t_n$.

The system input vector $^0u_n$ is a change fraction of a state quantity added to a state quantity of a fuselage (moving object) by next detection (time $t_{n+1}$) and includes, for example, an acceleration detected by the high accuracy acceleration sensor 132 and an angular velocity detected by the high accuracy gyro sensor 133.

The drive input matrix $^0D_n$ is a matrix for predicting a change applied to a state quantity $^0x_{n+1}$ upon the next detection (time $t_{n+1}$) by the system input vector $^0u_n$.

The observation matrix $^0H_n$ is a matrix indicating a relation between a state quantity $^0x_n$ and an observation quantity $^0z_n$ at the time $t_n$ in which the observation noise $^0v_n$ is a zero vector.

The state transition matrix $^0\Phi_n$ is a matrix indicating a transition relation from a state quantity $^0x_n$ at the time $t_n$ to a state quantity $^0x_{n+1}$ at the time $t_{n+1}$ in which the system noise $^0w_n$ and the system input vector $^0u_n$ are zero vectors.

The system noise $^0w_n$ and the observation noise $^0v_n$ may be assumed as white noises independent of each other.

Kalman filter processing includes Kalman filter update processing for updating a matrix used in an equation of a Kalman filter on the basis of current observation and estimating a current state quantity by the updated matrix and Kalman filter prediction processing for predicting a next state quantity from the estimated value after the current Kalman filter processing.

First, equations used in Kalman filter update processing will be described.

Kalman filter update processing in the estimator 135b is executed using following Equation (5), Equation (6), and Equation (7).

$$^0K_n = {^0P_n}^- {^0H_n}^T ({^0H_n}^T {^0P_n}^- {^0H_n} + {^0R_n})^{-1} \tag{5}$$

$$^0\theta_n^+ = {^0\theta_n}^- + {^0K_n}({^0z_n} - {^0H_n}^T {^0\theta_n}^-) \tag{6}$$

$$^0P_n^+ = {^0P_n}^- - {^0K_n}{^0H_n}^T {^0P_n}^- \tag{7}$$

wherein $^0P_n$ is an error covariance matrix at a time $t_n$ and $^0R_n$ is a covariance matrix of an observation noise $^0v_n$. $^0R_n$ is a design parameter set in accordance with noise characteristics of a GPS by a Kalman filter designer.

Further, a superscript "T" represents a transposed matrix, and a superscript "−1" represents an inverse matrix.

Next, equations used in Kalman filter prediction processing will be described.

A prediction value $^0x_{n+1}^-$ of a system state quantity and a prediction value $^0P_{n+1}^-$ of an error covariance matrix at a time $t_{n+1}$ are represented as in following Equation (8) and Equation (9), respectively.

$$^0x_{n+1}^- = {^0\Phi_n}{^0x_n^+} + {^0D_n}{^0u_n} \tag{8}$$

$$^0P_{n+1}^- = {^0\Phi_n}{^0P_n^+}{^0\Phi_n}^T + {^0G_n}{^0Q_n}{^0G_n}^T \tag{9}$$

wherein a subscript "n" represents a vector and a matrix at a time $t_n$, a subscript "n+1" represents a vector and a matrix at a time $t_{n+1}$, a superscript "+" represents an estimation value after Kalman filter processing, a superscript "−" represents a prediction value before Kalman filter processing, and a superscript "T" represents a transposed matrix. Further, $^0Q_n$ represents a covariance matrix of the system noise $^0w_n$ of Equation (1). However, $^0Q_n$ may be a design parameter set in accordance with flying object dynamics characteristics by the Kalman filter designer.

An operation of the high accuracy position and attitude estimation arithmetic unit 135 using the above equations will be described.

In step S101, the GPS receiver 131 detects a position at a time $t_n$. The high accuracy acceleration sensor 132 detects an acceleration. The high accuracy gyro sensor 133 detects an angular velocity.

In S102, position and attitude propagation processing is executed. First, regarding the current position vector p, the propagator 135a sets a position after Kalman filter processing predicted upon previous detection as a reference value. The propagator 135a sets a difference between the detection value of the position detected by the GPS receiver 131 and the reference value as $\Delta^0 p$. Regarding the velocity vector p', the propagator 135a determines a detection value of a velocity by integrating accelerations detected by the high accuracy acceleration sensor 132. The propagator 135a calculates a reference value of the velocity from a velocity calculated from the position detected by the GPS receiver 131 at the time $t_n$ and a velocity after Kalman filter processing predicted upon the previous detection. The propagator 135a sets a difference between the detection value and the reference value of the velocity as $\Delta^0 p$. Regarding the attitude vector θ, the propagator 135a determines a detection value of an attitude by integrating angular velocities detected by the high accuracy gyro sensor 133. The propagator 135a calculates a reference value of the attitude from an attitude calculated from the position measured by the GPS receiver 131 at the time $t_n$ using position dynamics of a moving object (airplane) and an attitude after Kalman filter processing predicted upon the previous detection. The propagator 135a sets a difference between the detection value and the reference value of the attitude as $\Delta^0 \theta$. In this manner, from a position, an acceleration, and an angular velocity detected by the GPS receiver 131, the high accuracy acceleration sensor 132, and the high accuracy gyro sensor 133, respectively, an observation quantity $^0z_n$ at the time $t_n$ is obtained.

A prediction matrix $^0P_n^-$ of the covariance matrix before the Kalman filter processing has been obtained from Equation (9) in the operation upon the previous detection. $^0R_n$ is a design parameter set in accordance with noise characteristics of the GPS by the Kalman filter designer. A Kalman gain $^0K_n$ is obtained by Equation (5).

Further, the propagator 135a calculates a system state quantity $^0x_n^+$ after Kalman filter processing at the time $t_n$ by Equation (6) on the basis of the prediction value $^0x_n^-$ of the system state quantity having been obtained in the operation upon the previous detection and the observation quantity $^0z_n$ observed in S101.

Further, the propagator 135a also calculates a covariance matrix $^0P_n^+$ after Kalman filter processing at the time $t_n$ by Equation (7) on the basis of the prediction matrix $^0P_n^-$ of the covariance matrix $^0P_n$ having been obtained in the operation upon the previous detection, the Kalman gain $^0K_n$, and the observation matrix $^0H_n$.

In this manner, in S102, the propagator 135a of the high accuracy position and attitude estimation arithmetic unit 135 calculates a system state quantity and an error covariance matrix. The high accuracy position and attitude estimation arithmetic unit 135 outputs a calculated position and attitude.

In S103, the estimator 135b of the high accuracy position and attitude estimation arithmetic unit 135 calculates a system input vector $^0u_n$, for example, from the acceleration detected by the high accuracy acceleration sensor 132 and the angular velocity detected by the high accuracy gyro sensor 133 and calculates a prediction value $^0x_{n+1}^-$ of the system state quantity and a prediction value $^0P_{n+1}^-$ of the covariance matrix of the time $t_{n+1}$ by Equation (8) and Equation (9) on the basis of the system state quantity and the error covariance matrix calculated in S102, respectively.

Further, the estimator 135b calculates prediction values of the position, the velocity, and the attitude for calculating a difference from $\Delta^0 p$, $\Delta^0 p'$, and $\Delta^0 \theta$ detected or calculated at the time $t_{n+1}$, respectively.

On the other hand, in the small light position and attitude estimation unit 140, as illustrated in FIG. 5, the GPS receiver 141, the small light acceleration sensor 142, the small light gyro sensor 143, and the gyro sensor 144 perform detection (S111), the small light position and attitude estimation arithmetic unit 145 (propagator 145a) executes position and attitude propagation processing (S112), and the small light position and attitude estimation arithmetic unit 145 (estimator 145b) executes position and attitude estimation processing (Kalman filter processing) (S113).

Equations used in Kalman filter processing executed by the small light position and attitude estimation arithmetic unit 145 will be described. The equations used in Kalman filter processing executed by the small light position and attitude estimation arithmetic unit 145 are basically the same as the equations used in Kalman filter processing executed by the high accuracy position and attitude estimation arithmetic unit 135.

In Kalman filter processing used by the small light position and attitude estimation arithmetic unit 145, a vector $^1z_k$ and a vector $^1x_k$ represented, for example, by Equations (10) and (11) are designated as an observation quantity and a state quantity, respectively.

$$^1z_k = (\Delta^1 p \Delta^1 p' \Delta^1 \theta) \qquad (10)$$

$$^1x_k = (\Delta^1 p\ \Delta^1 p'\Delta^1\theta\Delta^1 a_b\Delta^1\omega_b) \qquad (11)$$

wherein $\Delta^1 p$ is an error vector of a current position vector p=(x y z) of the moving object 30 (antenna) described in the inertial coordinate system of FIG. 2 in the small light position and attitude estimation unit 140. Further, $\Delta^1 p'$ is an error vector of a velocity vector p'=(x' y' z') of the moving object 30 (antenna) described in the inertial coordinate system of FIG. 2 in the small light position and attitude estimation unit 140. Further, $\Delta^1\theta$ is an error vector of an attitude vector $\theta=(\varphi\ \rho\ \Psi)$ of the moving object 30 (antenna) described in the inertial coordinate system of FIG. 2 in the small light position and attitude estimation unit 140. Further, $\Delta^1 a_+$, is an error vector with respect to a noise vector $a_b=(a_{bx}\ a_{by}\ a_{bz})$ indicating bias noise of the small light acceleration sensor 142 of the moving object 30 (antenna) described in the inertial coordinate system of FIG. 2 in the small light position and attitude estimation unit 140, and $\Delta^1\omega_b$ is an error vector with respect to a noise vector $\omega_b=(\omega_{bx}\ \omega_{by}\ \omega_{bz})$ indicating bias noise of a detection signal in which detection signals of the small light gyro sensor 143 and the gyro sensor 144 of the moving object 30 (antenna) described in the inertial coordinate system of FIG. 2 in the small light position and attitude estimation unit 140 are combined by interpolation.

Regarding the current position vector p, it is possible that a value directly detected by the GPS receiver 131 is set as a detection value, a position after Kalman filter processing predicted upon previous detection is set as a reference, and a difference between the detection value and the reference value is set as an error vector. Regarding the velocity vector p', it is possible that a value obtained by integrating detection values of the high accuracy acceleration sensor 132 is set as a detection value, a reference value is calculated from a velocity after Kalman filter processing predicted upon the previous detection and a velocity calculated from a detection value of the GPS receiver 131, and a difference between the detection value and the reference value is set as an error vector. Regarding the attitude vector θ, it is possible that a value obtained by integrating detection values of the high accuracy gyro sensor 133 is set as a detection value, a reference value is calculated from an attitude after Kalman filter processing predicted upon the previous detection and an attitude derived from position dynamics of a moving object (airplane) on the basis of a detection value of the GPS receiver 131, and a difference between the detection value and the reference value is set as an error vector.

In the small light gyro sensor 143 using an MEMS or the like, a frequency band is relatively wide but drift noise with respect to DC components is large, and therefore in order to ensure detection performance, it is necessary to compensate this drift noise using some kind of method. Here, the gyro sensor 144 of a mechanical system or the like in which drift noise is relatively small although a frequency band is narrow is combined with the small light gyro sensor 143, and respective detection signals are combined by interpolation to make the frequency band and detection accuracy compatible. Specifically, the small light gyro sensor detection signal 17 is passed through a bypass filter and the gyro sensor detection signal 18 is passed through a low pass filter, and thereafter these signals are combined.

Further, linear stochastic systems (state space models) of a state quantity $^1x_{k+1}$ at a time $t_{k+1}$ (upon next detection) and an observation quantity $^1z_k$ at a time $t_k$ (upon current detection) used in Kalman filter processing used by the small light position and attitude estimation arithmetic unit 145 are represented, for example, as in following Equations (12) and (13).

$$^1x_{k+1} = {}^1\Phi_k {}^1x_k + {}^1G_k {}^1w_k + {}^1D_k {}^1u_k \qquad (12)$$

$$^1z_k = {}^1H_k {}^1x_k + {}^1v_k \qquad (13)$$

wherein $^1x_k$ is a state quantity at a time $t_k$ (upon current detection), $^1\Phi_k$ is a state transition matrix at the time $t_k$, $^1G_k$ is a drive noise matrix at the time $t_k$, $^1w_k$ is a system noise at the time $t_k$, $^1D_k$ is a drive input matrix at the time $t_k$, $^1u_k$ is a system input vector at the time $t_k$, $^1H_k$ is an observation matrix at the time $t_k$, and $^1v_k$ is an observation noise at the time $t_k$.

Further, Kalman filter update processing in the estimator 145b of the small light position and attitude estimation arithmetic unit 145 can be executed using following Equation (14), Equation (15), and Equation (16).

$$^1K_k = {}^1P_k^- {}^1H_k ({}^1H_k^{T1}P_k^- {}^1H_k + {}^1R_k)^{-1} \qquad (14)$$

$$^1\theta_k^+ = {}^1\theta_k^- + {}^1K_k ({}^1z_k - {}^1H_k^{T1}\theta_k^-) \qquad (15)$$

$$^1P_k^+ = {}^1P_k^- - {}^1K_k {}^1H_k^{T1} P_k^- \qquad (16)$$

wherein $^1P_k$ is an error covariance matrix at a time $t_k$, and $^1R_k$ is a covariance matrix of an observation noise $^1v_k$. $^1R_k$ is a design parameter set in accordance with noise characteristics of a GPS by a Kalman filter designer.

Further, a superscript "T" represents a transposed matrix, and a superscript "−1" represents an inverse matrix.

Further, a prediction value $^1x_{k+1}^-$ of a system state quantity and a prediction value $^1P_{k+1}^-$ of an error covariance matrix of a time $t_{k+1}$ in Kalman filter prediction processing in the propagator 145a of the small light position and attitude estimation arithmetic unit 145 are represented as in following Equation (17) and Equation (18), respectively.

$$^1x_{k+1}{}^- = {}^1\Phi_k {}^1x_k{}^+ + {}^1D_k {}^1u_k \tag{17}$$

$$^1P_{k+1}{}^- = {}^1\Phi_k {}^1P_k{}^+ {}^1\Phi_k{}^T + {}^1G_k {}^1Q_k {}^1G_k{}^T \tag{18}$$

wherein a subscript "k" represents a vector and a matrix at a time $t_k$, a subscript "k+1" represents a vector and a matrix at a time $t_{k+1}$, a superscript "+" represents an estimation value after Kalman filter processing, a superscript "−" represents a prediction value before Kalman filter processing, and a superscript "T" represents a transposed matrix. Further, $^1Q_k$ represents a covariance matrix of the system noise $^1w_k$ of Equation (1). However, $^1Q_k$ may be a design parameter set in accordance with flying object dynamics characteristics by the Kalman filter designer.

An operation of the small light position and attitude estimation arithmetic unit 145 using the above equations will be described. In the small light position and attitude estimation unit 140, cycles of observation and Kalman filter processing are shorter than those of measurement and Kalman filter processing in the high accuracy position and attitude estimation unit 130, and measurement and Kalman filter processing are executed, for example, at a sampling frequency of 400 Hz.

In step S111, the GPS receiver 141 detects a position at a time $t_k$. The small light acceleration sensor 142 detects an acceleration. Further, the small light gyro sensor 143 and the gyro sensor 144 each detect an angular velocity.

In step S112, position and attitude propagation processing is executed. First, regarding the current position vector p, the propagator 145a sets a position after Kalman filter processing predicted upon previous detection as a reference value. The propagator 145a sets a difference between the detection value and the reference value of the position as $\Delta^0 p$. Regarding the velocity vector p', the propagator 145a determines a detection value of a velocity by integrating accelerations detected by the small light acceleration sensor 142. The propagator 145a calculates a reference value of the velocity from a velocity calculated from the position detected by the GPS receiver 141 at the time $t_k$ and a velocity after Kalman filter processing predicted upon the previous detection. The propagator 145a sets a difference between the detection value and the reference value of the velocity as $\Delta^0 p$. Regarding the attitude vector θ, the propagator 145a determines a detection value of an attitude by integrating angular velocities in which angular velocities detected by the small light gyro sensor 143 and the gyro sensor 144 are combined by interpolation. The propagator 135a calculates a reference value of an attitude from an attitude calculated from the position measured by the GPS receiver 131 at the time $t_k$ using position dynamics of a moving object (airplane) and an attitude after Kalman filter processing predicted upon the previous detection. The propagator 145a sets a difference between the detection value and the reference value of the attitude as $\Delta^0 \theta$. In this manner, from a position, an acceleration, and an angular velocity detected by the GPS receiver 141, the small light acceleration sensor 142, and the small light gyro sensor 143, and the gyro sensor 144, an observation value $^0z_k$ at the time $t_k$ is obtained. A prediction matrix $^1P_k{}^-$ of the covariance matrix before Kalman filter processing of the time $t_k$ has been obtained from Equation (18) in the operation upon the previous detection. $^1R_k$ is a design parameter set in accordance with noise characteristics of the GPS by the Kalman filter designer. A Kalman filter gain $^1K_k$ at the time $t_k$ is obtained by Equation (14).

Further, the propagator 145a calculates a system state quantity $^1x_k{}^+$ after Kalman filter processing at the time $t_k$ by Equation (15) on the basis of the prediction value $^1x_k{}^-$ of the system state quantity having been obtained in the operation upon the previous detection and the observation quantity $^0z_k$ observed in S111.

Further, the propagator 145a also calculates a covariance matrix $^1P_k{}^+$ after Kalman filter processing at the time $t_k$ by Equation (16) on the basis of the prediction matrix $^1P_k{}^-$ of the covariance matrix having been obtained in the operation upon the previous detection, the Kalman gain $^1K_k$, and the observation matrix $^1H_k$.

In this manner, in S112, the propagator 135a of the small light position and attitude estimation arithmetic unit 145 calculates a system state quantity and an error covariance matrix. The small light position and attitude estimation arithmetic unit 145 outputs a calculated position and attitude.

In S113, the estimator 145b of the small light position and attitude estimation arithmetic unit 145 calculates, on the basis of the system state quantity and the error covariance matrix calculated in S112, a prediction value $^1x_{k+1}{}^-$ of the system state quantity and a prediction value $^1P_{k+1}{}^-$ of the covariance matrix of the time $t_{k+1}$ by Equation (17) and Equation (18), respectively. Further, the estimator 135b calculates prediction values of the position, the velocity, and the attitude for calculating a difference from $\Delta^1 p$, $\Delta^1 p'$, and $\Delta^1 \theta$ detected or calculated at the time $t_{k+1}$.

In this manner, the small light position and attitude estimation unit 140 executes Kalman filter processing using the absolute position detected by the GPS receiver 141 mounted on the antenna, the acceleration detected by the small light acceleration sensor 142, the angular velocity detected by the small light gyro sensor 143 including an MEMS, and the angular velocity detected by the gyro sensor 144 of a mechanical system or the like for interpolating a detection performance restriction of the small light gyro sensor 143. The small light position and attitude estimation unit 140 outputs a small light position and attitude estimation arithmetic unit generation signal 19 including a calculated position and attitude, for example, at a sampling frequency of 400 Hz by the Kalman filter processing.

The position and attitude output unit 150 (propagator 150a) executes position and attitude propagation processing (S121), and the position and attitude output unit 150 (estimator 150b) executes position and attitude estimation processing (virtual Kalman filter processing) (S122).

The position and attitude output unit 150 generates a position and attitude interpolation estimation value 20 generated at a sampling frequency of $1/\Delta t_m$ Hz (wherein $\Delta t_m \leq \Delta t_k$) using a moving object high accuracy position and attitude estimation signal 14 including a high accuracy position and attitude propagation value generated at a relatively low sampling frequency $1/\Delta t_n$ Hz of 50 to 200 Hz, for example, and a small light position and attitude estimation arithmetic unit generation signal 19 including a position and attitude propagation value generated at a sampling frequency $1/\Delta t_k$ Hz of 400 Hz, for example.

The propagator 150a of the position and attitude output unit 150 sets a system state quantity and an error covariance matrix in the position and attitude output unit 150 as $^f\theta_m$ and $^f P_m$ respectively.

In Kalman filter processing used in the position and attitude output unit 150, a vector $^f z_m$ and a vector $^f \theta_m$ represented, for example, by following Equations (19) and (20) are designated as an observation quantity and a state quantity, respectively.

$$^fz_m = (\Delta^f p \ \Delta^f \theta) \tag{19}$$

$$^f\theta_m = (\Delta^f p \ \Delta^f \theta) \tag{20}$$

wherein $\Delta^f p$ is an error vector of a current position vector $p=(x\ y\ z)$, and $\Delta^f \theta$ is an error vector of an attitude vector $\theta=(\Phi\ \rho\ \Psi)$.

Regarding the current position vector p and the attitude vector θ, a position after Kalman filter processing predicted upon previous detection (time $t_{m-1}$) is set as a reference. The last output value from any one of the high accuracy position and attitude estimation unit 130 and the small light position and attitude estimation unit 140 is set as a detection value. A difference between the detection value and the reference value can be set as an error vector. Further, at a timing of outputting by the high accuracy position and attitude estimation unit 130, a value output by the high accuracy position and attitude estimation unit 130 is set as a detection value. At a timing of outputting by the small light position and attitude estimation unit 140, a value output by the small light position and attitude estimation unit 140 is set as a detection value. At a timing different from the outputs by both the high accuracy position and attitude estimation unit 130 and the small light position and attitude estimation unit 140, for example, the last output value from any one of the high accuracy position and attitude estimation unit 130 and the small light position and attitude estimation unit 140 is set as a detection value. A position after Kalman filter processing predicted upon previous detection (time $t_{m-1}$) is set as a reference. A difference between the detection value and the reference value can be set as an error vector.

Linear stochastic systems (state space models) used in Kalman filter processing used by the position and attitude output unit 150 are represented, for example, as in following Equations (21) and (22) in the same manner as for the high accuracy position and attitude estimation unit 130 and the small light position and attitude estimation unit 140.

A state quantity $^f\theta_{m+1}$ is a state quantity at a time $t_{m+1}$ that is a time of next detection, and an observation quantity $^fz_m$ is an observation quantity at a time $t_m$ that is a time of current detection.

$$^f\theta_{m+1} = {^f\Phi_m}{^f\theta_m} + {^fG_m}{^fw_m} + {^fD_m}{^fu_m} \tag{21}$$

$$^fz_m = {^fH_m}{^f\theta_m} + {^fv_m} \tag{22}$$

wherein $^f\theta_m$ is a state quantity at a time $t_m$, $^f\Phi_m$ is a state transition matrix at the time $t_m$, $^fG_m$ is a drive noise matrix at the time $t_m$, $^fw_m$ is a system noise at the time $t_m$, $^fD_m$ is a drive input matrix at the time $t_m$, $^fu_m$ is a system input vector at the time $t_m$, $^fH_m$ is an observation matrix at the time $t_m$, and $^fv_m$ is an observation noise at the time $t_m$.

The position and attitude output unit 150 generates a system input vector $^fu_m$ to be used in Kalman filter processing. The position and attitude output unit 150 generates, for example, an interpolation estimation value of an attitude at a sampling frequency $1/\Delta t_m$ Hz to be used in Kalman filter processing.

The position and attitude output unit 150 may generate, for example, $^fu_m$ as an angular velocity vector $^f\omega_k=[\omega_{xk}\ \omega_{yk}\ \omega_{zk}]^T$ of a certain value during a sampling time interval $\Delta t_m$. The high accuracy position and attitude estimation unit 130 and the small light position and attitude estimation unit 140 may output, for example, angular velocity vectors $^0w_n$ and $^1\omega_k$ together with a position and attitude. Further, regarding the angular velocity vector $^f\omega_k$ of a certain value, an angular velocity vector last output, before the time $t_m$, by the high accuracy position and attitude estimation unit 130 and the small light position and attitude estimation unit 140 may be set as $^f\omega_k$.

Kalman filter update processing in the estimator 150b can be executed using following Equation (23), Equation (24), and Equation (25) in the same manner as in the high accuracy position and attitude estimation unit 130 and the small light position and attitude estimation unit 140.

$$^fK_m = {^fP_m^-}{^fH_m^T}({^fH_m}{^fP_m^-}{^fH_m^T} + {^fR_m})^{-1} \tag{23}$$

$$^f\theta_m^+ = {^f\theta_m^-} + {^fK_m}({^fz_m} - {^fH_m}{^f\theta_m^-}) \tag{24}$$

$$^fP_m^+ = {^fP_m^-} - {^fK_m}{^fH_m}{^fP_m^T}{^-} \tag{25}$$

wherein $^fP_m$ is an error covariance matrix at a current observation time $t_m$, and $^fR_m$ is a covariance matrix of an observation noise $^fv_m$. $^fR_m$ is a design parameter set in accordance with noise characteristics of a GPS by a Kalman filter designer.

Further, a prediction value $^fx_{m+1}^-$ of a system state quantity and a prediction value $^fP_{m+1}^-$ of an error covariance matrix at a next observation time $t_{m+1}$ are represented as in following Equation (26) and Equation (27), respectively, as in the high accuracy position and attitude estimation unit 130 and the small light position and attitude estimation unit 140.

$$^f\theta_{m+1}^- = {^f\Phi_m}{^f\theta_m^+} + {^fD_m}{^fu_m} \tag{26}$$

$$^fP_{m+1}^- = {^f\Phi_m}{^fP_m^+}{^f\Phi_m^T} + {^fG_m}{^fQ_m}{^fG_m^T} \tag{27}$$

wherein $^fQ_m$ represents a covariance matrix of the system noise $^fw_m$ of Equation (19).

An operation of the position and attitude output unit 150 using the above equations will be described. First, processing in S121 will be described. In an operation at a previous observation time $t_{m-1}$, a prediction matrix $^fP_m^-$ of a covariance matrix before Kalman filter processing of a current observation time series "m" has been obtained from Equation (27). Further, a Kalman gain $^fK_m$ of the observation time series "m" at a time $t_m$ has been obtained by Equation (23).

The propagator 150a calculates a system state quantity $^f\theta_m^+$ after Kalman filter processing at the time $t_m$ by Equation (24) on the basis of a prediction value $^f\theta_m^-$ of a system state quantity and an observation quantity $^fz_m$ at the time $t_m$. The observation quantity $^fz_m=(\Delta^fp\ \Delta^f\theta)$ at the time $t_m$ may be calculated using a position and attitude last acquired from the high accuracy position and attitude estimation unit 130 and the small light position and attitude estimation unit 140. In other words, it is possible that at a timing of outputting by the high accuracy position and attitude estimation unit 130, values of a current position vector p and an attitude vector θ output by the high accuracy position and attitude estimation unit 130 are used as detection values, at a timing of outputting by the small light position and attitude estimation unit 140, values of a current position vector p and an attitude vector θ output by the small light position and attitude estimation unit 140 are used as detection values, and at a timing different from both of the outputs by the high accuracy position and attitude estimation unit 130 and the small light position and attitude estimation unit 140, for example, values of a current position vector p and an attitude vector θ last output by any one of the high accuracy position and attitude estimation unit 130 and the small light position and attitude estimation unit 140 are used as detection values to calculate an observation quantity $^fz_m$.

Further, the propagator 150a also calculates a covariance matrix $^fP_m^+$ after Kalman filter processing at the time $t_m$ by Equation (25) on the basis of the prediction matrix $^fP_m^-$ of the covariance matrix, the Kalman gain $^fK_m$, and the observation matrix $^fH_m$.

In this manner, in S121, the propagator 150a calculates a system state quantity and an error covariance matrix. The position and attitude output unit 150 outputs the calculated state quantity.

Next, first, processing of S122 will be described. The estimator 150b of the position and attitude output unit 150 generates a system input vector $^f u_m$. The estimator 150b may set an angular velocity vector $^0\omega_n$ or $^1\omega_k$ last detected by the high accuracy position and attitude estimation unit 130 and the small light position and attitude estimation unit 140 as a system input vector $^f u_m$. The estimator 150b calculates a prediction value $^f \theta_{m+1}^-$ (position and attitude interpolation estimation value 20) of the system state quantity of a next observation time series "m+1" and a prediction value $^f P_{m+1}^-$ of the covariance matrix by Equation (26) and Equation (27), respectively, on the basis of the generated system input vector $^f u_m$ and the system state quantity $^f \theta_m^+$ and the error covariance matrix $^f P_m^+$ calculated in S121.

Further, the estimator 150b calculates prediction values of a position and attitude after Kalman filter processing for determining a difference from detection values of $\Delta^f p$ and $\Delta^0 \theta$ calculated in the next observation time series "m+1."

It has been described that the estimator 150b may set an angular velocity vector $^0\omega_n$ or $^1\omega_k$ last detected by the high accuracy position and attitude estimation unit 130 and the small light position and attitude estimation unit 140 as a system input vector $^f u_m$, but the present invention is not limited thereto. The estimator 150b may set an input vector $^f u_m$ to the system to be a value represented by following Equation (28).

$$^f u_m = {^f \omega_k} + \frac{{^f \omega_k} - {^f \omega_{k-1}}}{t_k - t_{k-1}}(t_{m+1} - t_k) \qquad (28)$$

A time $t_k$ is a time when an angular velocity vector is detected last in the small light position and attitude estimation unit 140, a time $t_{k-1}$ is a time when an angular velocity vector is acquired from the small light position and attitude estimation unit 140 before the time $t_k$, and $^f \omega_k$ and $^f \omega_{k-1}$ are angular velocity vectors acquired from the small light position and attitude estimation unit 140 at the times $t_k$ and $t_{k-1}$ ($<t_{m+1}$), respectively.

In this manner, according to the present exemplary embodiment, a small light position and attitude estimation arithmetic unit generation signal 19 including a position and attitude propagation value is subjected to interpolation processing on the basis of a moving object high accuracy position and attitude estimation signal 14 including a high accuracy position and attitude propagation value. Therefore, further accuracy enhancement can be realized, compared with interpolation processing singly using the small light position and attitude estimation arithmetic unit generation signal 19 including a position and attitude propagation value.

Interpolation processing in the position and attitude output unit 150 described here is a technique realized by appropriately combining a high accuracy position and attitude propagation value and a position and attitude propagation value on the basis of a noise model of a gyro sensor applied to the small light position and attitude estimation unit 140, and is not a technique in which related technologies are simply combined.

In the present exemplary embodiment, in a position and attitude estimation device that generates attitude information of a drive instrument mounted on a moving object, detection signals of a plurality of sensors mounted on the moving object are combined, and thereby a high accuracy position and attitude estimation unit estimates a position and attitude. Further, detection signals of a plurality of sensors mounted on the drive instrument are combined, and thereby a small light position and attitude estimation unit estimates a position and attitude. Further, it has been assumed that signals estimated by the high accuracy position and attitude estimation unit and the small light position and attitude estimation unit are combined, and thereby a position and attitude interpolation estimation value is generated.

Specifically, in the present exemplary embodiment, a high accuracy position and attitude estimation unit mounted on a moving object main body is combined with a small light position and attitude estimation unit including a small light acceleration sensor and a small light gyro sensor and being attached to a drive instrument. Further, a position and attitude propagation value generated by the high accuracy position and attitude estimation unit and a position and attitude propagation value generated by the small light position and attitude estimation unit are used, and thereby a position and attitude estimation interpolation value capable of interpolating the position and attitude propagation value output by the small light position and attitude estimation unit by high sampling is generated.

As a result, in the present exemplary embodiment, even when a detection interval of a position and attitude propagation value generated by the small light position and attitude estimation unit is not sufficiently short and is not sufficiently high in accuracy, attitude angular velocity information generated by the small light position and attitude estimation unit at the same time as the position and attitude propagation value is combined, and the information and the value are used. Thereby, changes of position and attitude propagation values discretely generated can be interpolated, and real-time high accuracy position and attitude estimation of a mounted drive instrument mounted on a moving object can be achieved. Further, position and attitude propagation values generated by the small light position and attitude estimation unit are stored as time-series data and a plurality of pieces of the data are combined, and thereby enhancement of position and attitude estimation accuracy can be achieved, although real-time properties are sacrificed.

Second Exemplary Embodiment

Hereinafter, with reference to the drawings, a second exemplary embodiment will be described. In the present exemplary embodiment, a small light position and attitude estimation unit estimates a position and attitude using an output signal of a high accuracy position and attitude estimation unit, compared with the first exemplary embodiment. Here, points different from the first exemplary embodiment will be mainly described.

Figure 6:
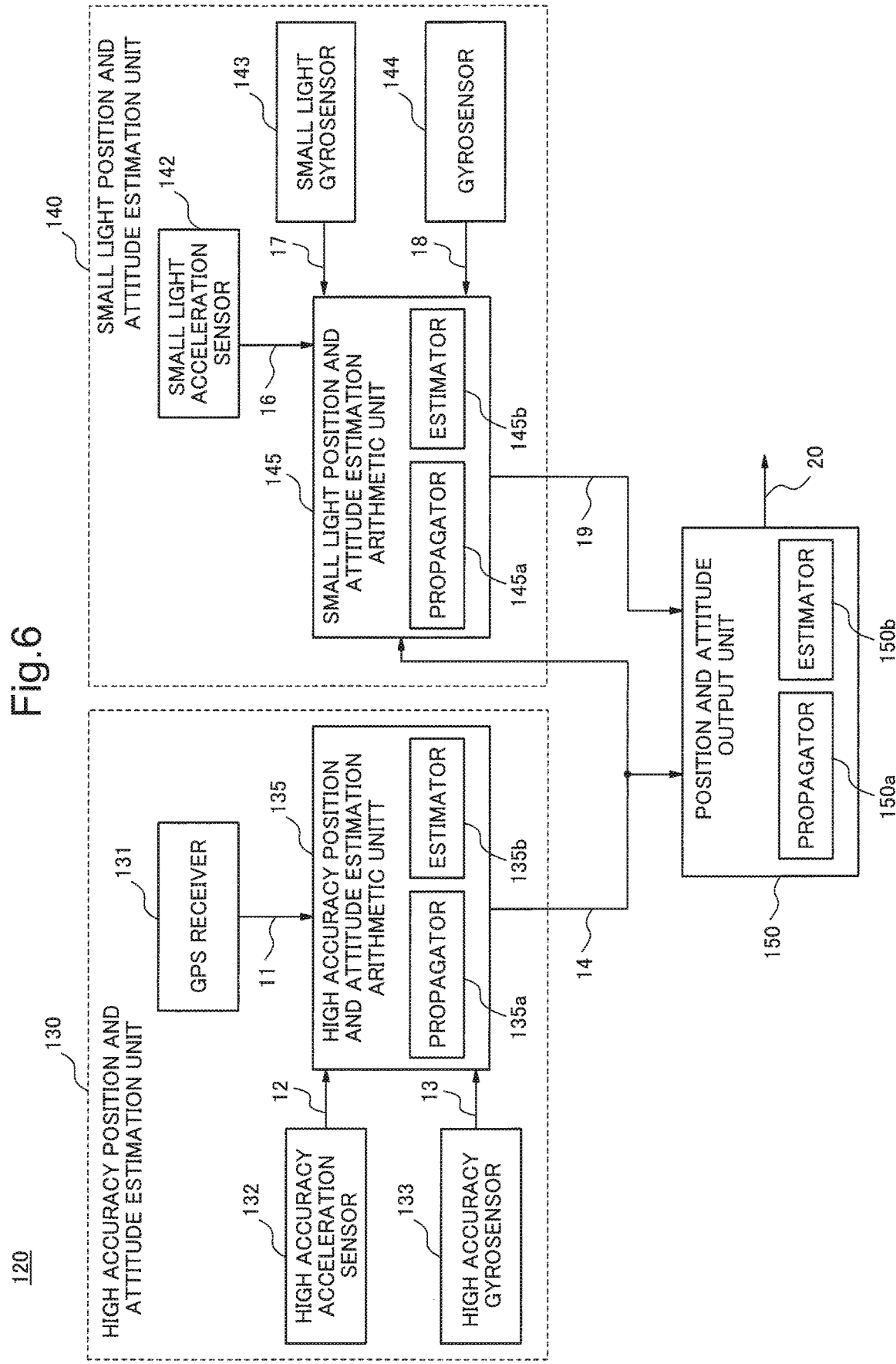
FIG. 6 is a block diagram illustrating a configuration of a position and attitude estimation device according to a second exemplary embodiment.

FIG. 6 illustrates a function block diagram of a position and attitude estimation device 120 according to the present exemplary embodiment. As illustrated in FIG. 6, in the present exemplary embodiment, a small light position and attitude estimation unit 140 does not include a GPS receiver 141. In other words, the small light position and attitude estimation unit 140 includes a small light acceleration sensor 142, a small light gyro sensor 143, a gyro sensor 144, and a small light position and attitude estimation arithmetic unit 145.

The small light position and attitude estimation arithmetic unit 145 estimates a position and attitude of an antenna on the basis of detection of the small light acceleration sensor 142, the small light gyro sensor 143, and the gyro sensor 144 and estimation of a high accuracy position and attitude estimation unit 130. In other words, the small light position and attitude estimation arithmetic unit 145 generates a small light position and attitude estimation arithmetic unit generation signal 19 on the basis of a small light acceleration sensor detection signal 16, a small light gyro sensor detection signal 17, a gyro sensor detection signal 18, and a moving object high accuracy position and attitude estimation signal 14.

The small light position and attitude estimation arithmetic unit 145 sets a position and attitude estimated by the high accuracy position and attitude estimation unit 130 as a reference. The small light position and attitude estimation arithmetic unit 145 executes (virtual) Kalman filter processing using an acceleration detected by the small light acceleration sensor 142, an angular velocity detected by the small light gyro sensor 143, and an angular velocity detected by the gyro sensor 144. Thereby, the small light position and attitude estimation arithmetic unit 145 estimates a position and attitude of a second timing (cycle).

Equations used in Kalman filter processing executed by the small light position and attitude estimation arithmetic unit 145 of the present exemplary embodiment are basically the same as the equations used in Kalman filter processing executed by the small light position and attitude estimation arithmetic unit 145 of the first exemplary embodiment.

Further, equations of linear stochastic systems (state space models) of a state quantity $^1x_{k+1}$ and an observation quantity $^1z_k$ used in Kalman filter processing used by the small light position and attitude estimation arithmetic unit 145 are basically the same as the equations used in the small light position and attitude estimation arithmetic unit 145 of the first exemplary embodiment. Further, equations of Kalman filter update processing in an estimator 145b are also basically the same as the equations used in the small light position and attitude estimation arithmetic unit 145 of the first exemplary embodiment. Further, equations of a prediction value $^1x_{k+1}^-$ of a system state quantity and a prediction value $^1P_{k+1}^-$ of an error covariance matrix in Kalman filter prediction processing in a propagator 145a are also basically the same as the equations used in the small light position and attitude estimation arithmetic unit 145 of the first exemplary embodiment.

Next, an operation of the position and attitude estimation device 120 of the present exemplary embodiment will be described. The operation of the present exemplary embodiment is basically the same as in FIG. 5 of the first exemplary embodiment, and only processing of S112 and S113 in the small light position and attitude estimation unit 140 (the small light position and attitude estimation arithmetic unit 145) is mainly different.

The small light position and attitude estimation unit 140 executes virtual estimation processing in which a framework of a Kalman filter is diverted, using a moving object high accuracy position and attitude estimation signal 14 generated by the high accuracy position and attitude estimation unit 130 in addition to the small light acceleration sensor detection signal 16, the small light gyro sensor detection signal 17, and the gyro sensor detection signal 18. Thereby, the small light position and attitude estimation unit 140 generates a small light position and attitude estimation arithmetic unit generation signal 19 including a position and attitude propagation value at a sampling frequency of at most 400 Hz.

In step S111, in the same manner as in the first exemplary embodiment, the small light acceleration sensor 142 detects an acceleration, and the small light gyro sensor 143 and the gyro sensor 144 detect angular velocities.

Position and attitude propagation processing in S112 is the same as in the first exemplary embodiment. In above Equation (11) and Equation (12), a superscript "+" indicates an estimation value after virtual Kalman filter processing. Further, a superscript "−" indicates a propagation prediction value before virtual Kalman filter processing. Further, $^1Q_k$ is a covariance matrix (a design parameter set in accordance with flying object dynamics characteristics and the like by a designer of a virtual Kalman filter) of a system noise $^1w_k$.

In step S112, in the present exemplary embodiment, regarding the current position vector p, the propagator 145a determines a detection value of a position by integrating twice accelerations detected by the small light acceleration sensor 142. The propagator 145a calculates a reference value from a position estimated by the high accuracy position and attitude estimation unit 130 and a position after Kalman filter processing predicted upon previous detection. The propagator 145a sets a difference between the detection value and the reference value of the position as $\Delta^0 p$.

Regarding the velocity vector p', the propagator 145a determines a detection value of a velocity by integrating accelerations detected by the small light acceleration sensor 142. The propagator 145a calculates a reference value of a velocity from a position estimated by the high accuracy position and attitude estimation unit 130 and a velocity after Kalman filter processing predicted upon the previous detection. The propagator 145a sets a difference between the detection value and the reference value of the velocity as $\Delta^0 p$.

Regarding the attitude vector θ, the propagator 145a determines a detection value of an attitude by integrating angular velocities in which angular velocities detected by the small light gyro sensor 143 and the gyro sensor 144 are combined by interpolation. The propagator 145a calculates a reference value from an attitude estimated by the high accuracy position and attitude estimation unit 130 and an attitude after Kalman filter processing predicted upon the previous detection. The propagator 145a sets a difference between the detection value and the reference value of the attitude as $\Delta^0 \theta$.

In this manner, in step S111, a fuselage sensor detects a position, an acceleration, and an angular velocity, and an observation quantity $^0z_k$ at a time $t_k$ is obtained.

In the same manner as in the first exemplary embodiment, the propagator 145a of the small light position and attitude estimation arithmetic unit 145 calculates a system state quantity and an error covariance matrix. The small light position and attitude estimation arithmetic unit 145 outputs a calculated position and attitude.

Further, in S113, the estimator 145b of the small light position and attitude estimation arithmetic unit 145 calculates, on the basis of the system state quantity and the error covariance matrix calculated in S112, a prediction value $^1\theta_{m+1}^-$ of the system state quantity and a prediction value $^1P_{m+1}^-$ of the covariance matrix of a time $t_{m+1}$ by Equation (17) and Equation (18), respectively. Further, the estimator 145b calculates prediction values of a position, a velocity, and an attitude based on Kalman filter processing for calculating differences from detection values of the position, the velocity, and the attitude.

As a result, in the same manner as in the first exemplary embodiment, the small light position and attitude estimation unit 140 outputs, after updating a state quantity, a system state quantity prediction value $^1x_{m+1}^-$ and an error covariance matrix prediction value $^1P_{m+1}^-$ as a small light position and attitude estimation arithmetic unit generation signal 19 including a position and attitude propagation value.

In this manner, in the present exemplary embodiment, the small light position and attitude estimation unit 140 executes estimation processing using a position and attitude estimated by the high accuracy position and attitude estimation unit 130 as a reference.

Further, the position and attitude output unit 150 executes interpolation processing by executing estimation processing using virtual Kalman filter processing in the same manner as in the first exemplary embodiment, using the position and attitude estimated by the small light position and attitude estimation unit 140 as a reference. Therefore, further accuracy enhancement can be realized, compared with interpolation processing singly using the small light position and attitude estimation arithmetic unit generation signal 19 including a position and attitude propagation value.

While the present invention has been described with reference to the exemplary embodiments, the present invention is not limited to the exemplary embodiments. The constitution and details of the present invention can be subjected to various modifications which can be understood by those skilled in the art, without departing from the scope of the present invention.

While it has been described that, for example, an observation quantity and a state quantity used in Kalman filter processing used by the position and attitude output unit 150 as described above include an error vector of a current position vector p=(x y z) and an error vector of an attitude vector θ=(φ ρ Ψ), the present invention is not limited thereto. The position and attitude output unit 150 may be configured to acquire, for example, values of detection signals of the small light acceleration sensor 142, the small light gyro sensor 143, and the gyro sensor 144 used in Kalman filter processing via the small light position and attitude estimation arithmetic unit 145. An observation quantity and a state quantity used in Kalman filter processing by the position and attitude output unit 150 at that time may include an error vector of a velocity vector p'=(x' y' z'). Further, an error vector with respect to a noise vector $a_b=(a_{bx}\ a_{by}\ a_{bz})$ indicating bias noise of the small light acceleration sensor 142 may be included. Further, an error vector with respect to a vector $\omega_b=(\omega_{bx}\ \omega_{by}\ \omega_{bz})$ indicating bias noise of a detection signal in which detection signals of the small light gyro sensor 143 and the gyro sensor 144 are combined by interpolation may be included.

Each component in the exemplary embodiments may include hardware, software, or both thereof, may include one piece of hardware or software, or may include a plurality of pieces of hardware or software. Each function (each processing) of a radar device or a position and attitude estimation device may be realized using a computer including a CPU, a memory, and the like. It is possible that, for example, a control program for performing a control method in the exemplary embodiments is stored on a storage device (storage medium), and each function is realized by causing the CPU to execute the control program stored on the storage device.

A part or all of the exemplary embodiments can be also described as the following supplementary notes, but the present invention is not limited to the following.
(Supplementary Note 1)

An attitude estimation device of a moving object-mounted instrument that generates attitude information of a drive instrument mounted on a moving object such as a flying object, a spacecraft, a vehicle, or the like including: a GPS receiver, mounted on the moving object, for detecting position information of the moving object as a moving object absolute position detection signal; a high accuracy acceleration sensor, mounted on the moving object, for detecting acceleration information of the moving object as a moving object acceleration detection signal; a high accuracy gyro sensor, mounted on the moving object, for detecting angular velocity information of the moving object as a moving object attitude angular velocity detection signal; a small light acceleration sensor, mounted on the drive instrument, for detecting acceleration information of the drive instrument as a small light acceleration sensor detection signal; a high accuracy position and attitude estimation device for generating a moving object high accuracy position and attitude estimation signal including a high accuracy position and attitude propagation value by combining the moving object absolute position detection signal, the moving object acceleration detection signal, and the moving object attitude angular velocity detection signal; a small light gyro sensor, mounted on the drive instrument, for detecting angular velocity information of the drive instrument as a small light gyro sensor detection signal; a gyro sensor, mounted on the drive instrument, for detecting angular velocity information of the drive instrument as a gyro sensor detection signal; a small light position and attitude estimation arithmetic unit, mounted on the drive instrument, for generating position and attitude angular information of the drive instrument as a small light position and attitude estimation arithmetic unit generation signal including a position and attitude propagation value by combining the small light acceleration sensor detection signal, the small light gyro sensor detection signal, and the gyro sensor detection signal; and an attitude estimation device, mounted on the moving object, for generating attitude angular information of the drive instrument as an attitude interpolation estimation value by combining the moving object high accuracy position and attitude estimation signal including the high accuracy position and attitude propagation value and the small light position and attitude estimation arithmetic unit generation signal including the position and attitude propagation value.
(Supplementary Note 2)

The attitude estimation device of the moving object-mounted instrument according to Supplementary Note 1, wherein the attitude estimation device generates the attitude interpolation estimation value by virtual Kalman filter arithmetic processing configured by combining the moving object high accuracy position and attitude estimation signal including the high accuracy position and attitude propagation value and the small light position and attitude estimation arithmetic unit generation signal including the position and attitude propagation value.
(Supplementary Note 3)

The attitude estimation device of the moving object-mounted instrument according to Supplementary Note 1, wherein the attitude estimation device estimates a change of an angular velocity using a change rate (an angular acceleration signal) of an angular velocity signal in a sampling interval between an angular velocity signal before one sampling generated at a previous time and an angular velocity signal generated at a current time for an angular velocity signal included in the small light position and attitude estimation arithmetic unit generation signal including the position and attitude propagation value, and generates the attitude interpolation estimation value by virtual Kalman filter arithmetic processing using an angular velocity signal based on the estimation as an input.

This application is based upon and claims the benefit of priority from Japanese patent application No. 2014-091279, filed on Apr. 25, 2014, the disclosure of which is incorporated herein in its entirety by reference.

REFERENCE SIGNS LIST

1 First detection unit
2 First position and attitude estimation unit
3 Second detection unit
4 Second position and attitude estimation unit
5 Position and attitude output unit
10 Position and attitude estimation device
11 Moving object absolute position detection signal
12 Moving object acceleration detection signal
13 Moving object attitude angular velocity detection signal
14 Moving object high accuracy position and attitude estimation signal
15 Absolute position detection signal
16 Small light acceleration sensor detection signal
17 Small light gyro sensor detection signal
18 Gyro sensor detection signal
19 Small light position and attitude estimation arithmetic unit generation signal
20 Position and attitude interpolation estimation value
30 Moving object
31 Fuselage
100 Radar device
101 Antenna unit
102 Signal processing unit
103 Antenna sensor
104 Fuselage sensor
110 Transmission unit
111 Reception unit
112 Image processing unit
113 Circulator
114 Control unit
115 Position and attitude estimation unit
120 Position and attitude estimation device
130 High accuracy position and attitude estimation unit
131 GPS receiver
132 High accuracy acceleration sensor
133 High accuracy gyro sensor
135 High accuracy position and attitude estimation arithmetic unit
135a Propagator
135b Estimator
140 Small light position and attitude estimation unit
141 GPS receiver
142 Small light acceleration sensor
143 Small light gyro sensor
144 Gyro sensor
145 Small light position and attitude estimation arithmetic unit
145a Propagator
145b Estimator
150 Position and attitude output unit
150a Propagator
150b Estimator
201 Antenna
202 Antenna drive mechanism

What is claimed is:

1. A position and attitude estimation device comprising:
a memory configured to store one or more instructions; and
a processor configured to execute the one or more instructions to implement:
a first detection unit that includes a first position detection unit configured to detect a first detected position of a moving object, a first acceleration detection unit configured to detect a first acceleration of the moving object, and a first angular velocity detection unit configured to detect a first angular velocity of the moving object;
a first position and attitude estimation unit configured to estimate a first position and attitude of the moving object at a first timing cycle, by using the detected first position as a reference, and by executing Kalman filter processing using the detected first acceleration and the detected first angular velocity;
a second detection unit that includes a second acceleration detection unit configured to detect a second acceleration of the moving object, and a second angular velocity detection unit configured to detect a second angular velocity of the moving object;
a second position and attitude estimation unit configured to estimate a second position and attitude of the moving object at a second timing cycle different from the first timing cycle, by using the first position estimated by the first position and attitude estimation unit as a reference, and by executing Kalman filter processing using the detected second acceleration and the detected second angular velocity; and
a position and attitude output unit configured to output a third position and attitude of the moving object at a third timing cycle different from the first timing cycle and the second timing cycle, based on the estimated first position and attitude and the estimated second position and attitude.

2. The position and attitude estimation device according to claim 1, wherein
the first acceleration detection unit is configured to detect an acceleration more accurately than the second acceleration detection unit, and
the first angular velocity detection unit is configured to detect an angular velocity more accurately than the second angular velocity detection unit.

3. The position and attitude estimation device according to claim 1, wherein
a cycle for estimating the second position and attitude is shorter than a cycle for estimating the first position and attitude.

4. The position and attitude estimation device according to claim 1, wherein
the second detection unit is configured to detect the second position and attitude parameters pertaining to drive unit driven by being mounted on the moving object.

5. The position and attitude estimation device according to claim 1, wherein
the moving object includes a radar antenna that is configured to perform an observation based on the third position and attitude, and
the first detection unit is disposed in the moving object and the second detection unit is disposed in the radar antenna.

6. An image processing device comprising: a memory configured to store one or more instructions; and a processor configured to execute the one or more instructions to implement: a moving object position and attitude estimation unit configured to estimate a position and attitude of a moving object; and an image processing unit configured to execute, based on the estimated position and attitude, image processing for a signal observed by a radar mounted on the moving object, wherein the moving object position and attitude estimation unit comprises:
- a first detection unit that includes a first position detection unit configured to detect a first detected position of a moving object, a first acceleration detection unit configured to detect a first acceleration of the moving object, and a first angular velocity detection unit configured to detect a first angular velocity of the moving object;
- a first position and attitude estimation unit configured to estimate a first position and attitude of the moving object at a first timing cycle, by using the detected first position as a reference, and by executing Kalman filter processing using the detected first acceleration and the detected first angular velocity;
- a second detection unit that includes a second acceleration detection unit configured to detect a second acceleration of the moving object, and a second angular velocity detection unit configured to detect a second angular velocity of the moving object;
- a second position and attitude estimation unit configured to estimate a second position and attitude of the moving object at a second timing cycle different from the first timing cycle, by using the first position estimated by the first position and attitude estimation unit as a reference, and by executing Kalman filter processing using the detected second acceleration and the detected second angular velocity; and
- a position and attitude output unit configured to output a third position and attitude of the moving object at a third timing cycle different from the first timing cycle and the second timing cycle, based on the estimated first position and attitude and the estimated second position and attitude.

7. A position and attitude estimation method comprising:
- detecting a first detected position, a first acceleration, and a first angular velocity of a moving object;
- estimating a first position and attitude of the moving object at a first timing cycle, by using the first detected position as a reference, and by executing Kalman filter processing using the detected first acceleration and the detected first angular velocity;
- detecting a second acceleration, and a second angular velocity of the moving object;
- estimating a second position and attitude of the moving object at a second timing cycle different from the first timing cycle, by using the estimated first position as a reference, and by executing Kalman filter processing using the detected second acceleration and the detected second angular velocity; and
- outputting a third position and attitude of the moving object at a third timing cycle different from the first timing cycle and the second timing cycle, based on the estimated first position and attitude and the estimated second position and attitude.

* * * * *